US008867655B2

(12) United States Patent
Park

(10) Patent No.: US 8,867,655 B2
(45) Date of Patent: Oct. 21, 2014

(54) APPARATUS AND METHOD FOR TRANSMITTING DATA USING MULTIPLE ANTENNAS AND BEAMFORMING

(75) Inventor: Kyoung Min Park, Seoul (KR)

(73) Assignee: Pantech Co., Ltd., Seoul (KR)

(*) Notice: Subject to any disclaimer, the term of this patent is extended or adjusted under 35 U.S.C. 154(b) by 1 day.

(21) Appl. No.: 13/824,177

(22) PCT Filed: Sep. 15, 2011

(86) PCT No.: PCT/KR2011/006809
§ 371 (c)(1),
(2), (4) Date: Mar. 15, 2013

(87) PCT Pub. No.: WO2012/036481
PCT Pub. Date: Mar. 22, 2012

(65) Prior Publication Data
US 2013/0177102 A1    Jul. 11, 2013

(30) Foreign Application Priority Data
Sep. 17, 2010  (KR) .......... 10-2010-0092125

(51) Int. Cl.
*H04B 7/06* (2006.01)
(52) U.S. Cl.
CPC ............. *H04B 7/06* (2013.01); *H04B 7/0639* (2013.01); *H04B 7/0617* (2013.01); *H04B 7/0691* (2013.01)
USPC ........... 375/295; 375/259; 375/260; 375/267; 375/299; 375/304; 375/316; 375/347; 375/349
(58) Field of Classification Search
CPC .. H04B 7/0617; H04B 7/0413; H04B 7/0669; H04B 7/0613; H04B 7/02; H04B 7/022; H04B 7/04; H04B 7/0408; H04B 7/0456; H04B 7/0615; H04B 7/0639; H04B 7/0667; H04B 7/0404; H04B 7/08; H04B 7/10; H04B 7/0891

USPC ......... 375/259, 260, 267, 295, 299, 304, 316, 375/347, 349
See application file for complete search history.

(56) References Cited

U.S. PATENT DOCUMENTS 6,950,678 B1 * 9/2005 Mujtaba et al. ............ 455/562.1
8,270,375 B2 * 9/2012 Ylitalo ........................ 370/334

(Continued)

FOREIGN PATENT DOCUMENTS

KR  10-2007-0113967  11/2007
KR  10-2010-0013263   2/2010
KR  10-2010-0024339   3/2010

OTHER PUBLICATIONS

PCT/KR2009/004523 published on Mar. 4, 2010, Jae Wan Kim.*

(Continued)

*Primary Examiner* — Siu Lee
(74) *Attorney, Agent, or Firm* — H.C. Park & Associates, PLC

(57) ABSTRACT

Provided are an apparatus and method for transmitting data using multiple antennas and beamforming. The apparatus of the present invention comprises: a modulation unit which performs constellation mapping on input bits to generate modulated symbols; a pre-coding unit which multiplies a pre-coding matrix and the modulated symbols to generate pre-coded symbols; and a plurality of transmitting antennas for transmitting the pre-coded symbols. According to the present invention, a beam width is maintained constant, regardless of a radiation angle, thus preventing a loss of power caused by an angular spread and preventing the generation of shadow zone at a large radiation angle.

8 Claims, 17 Drawing Sheets

(56) References Cited

U.S. PATENT DOCUMENTS

| | | | |
|---|---|---|---|
| 2004/0009755 A1* | 1/2004 | Yoshida | 455/101 |
| 2007/0274411 A1* | 11/2007 | Lee et al. | 375/267 |
| 2009/0211079 A1* | 8/2009 | Toso et al. | 29/600 |
| 2010/0295729 A1* | 11/2010 | Nogami | 342/372 |
| 2011/0039501 A1* | 2/2011 | Achour et al. | 455/73 |
| 2011/0057852 A1* | 3/2011 | Holland et al. | 343/795 |
| 2011/0128917 A1* | 6/2011 | Ko et al. | 370/328 |
| 2011/0142166 A1* | 6/2011 | Kim et al. | 375/296 |
| 2013/0094344 A1* | 4/2013 | Zhang et al. | 370/208 |

OTHER PUBLICATIONS

International Search Report of PCT/KR2011/006809 was mailed Apr. 4, 2012.

\* cited by examiner

APPARATUS AND METHOD FOR TRANSMITTING DATA USING MULTIPLE ANTENNAS AND BEAMFORMING

CROSS-REFERENCE TO RELATED APPLICATIONS

This application is the National Stage Entry of International Application No. PCT/KR2011/006809, filed on Sep. 15, 2011, and claims priority from and the benefit of Korean Patent Application No. 10-2010-0092125, filed on Sep. 17, 2010, both of which are hereby incorporated by reference for all purposes as if fully set forth herein.

BACKGROUND

1. Field

The present invention relates to wireless communication and, more particularly, to a method and apparatus for transmitting data using multiple antennas and beamforming.

2. Discussion of the Background

In general, in a multi-cellular communication system, if communication between a base station and user equipment is performed in the state in which a frequency reuse factor '1' is maintained in the same time and frequency band in each cell by not taking other cells into consideration, the performance of user equipment closer to a cell edge is greatly deteriorated owing to the distortion of a reception signal resulting from a reduction in the power of the reception signal and interference from other cells.

Some schemes have been researched so far in order to overcome a phenomenon in which performance is deteriorated due to this power reduction and interference. As one of the schemes, a cooperative transmission and reception scheme between multiple cells or between multiple transmission terminals is being discussed. The cooperative transmission and reception scheme is also called a Coordinated Multiple Point (CoMP) transmission and reception scheme in the LTE-A (Long Term Evolution-Advanced) standard. The CoMP transmission and reception scheme generally designates a method in which different base stations or multiple transmission terminals perform communication with the same user equipment through cooperation. That is, the CoMP transmission and reception scheme is a scheme in which a plurality of base stations performs downlink transmission or uplink reception through cooperation, and this scheme includes that a plurality of base stations performs downlink or uplink scheduling through cooperation. This scheme can improve a transmission power gain and signal sensitivity for pieces of user equipment having the intensity of a signal weaker than that of user equipment that is placed at the central area of a cell or an area having good signal reception sensitivity in a boundary area between cells or an area in which signal reception sensitivity is poor and can improve the transfer rate of the entire system by effectively removing the influence of interference.

Multiple antenna technology is technology for increasing a capacity or improving performance by using multiple antennas in the transmitter or receiver of a wireless communication system. Multiple antenna technology is technology for completing one entire message by gathering data fragments received from multiple antennas without depending on a single antenna path in order to receive one entire message. If the number of transmission antennas and the number of reception antennas are increased at the same time, frequency efficiency can be improved because a theoretical channel transmission capacity is increased in proportion to the number of antenna.

If the multiple antenna technology and the cooperative transmission and reception scheme are grafted, the intensity of a signal received by user equipment placed at a cell edge or user equipment placed in an area where reception sensitivity is poor can be increased. This method, however, can give interference to user equipment placed in another cell. If the number of transmission antennas is increased in order to remove this interference, there is a problem in that a power loss is generated because a beam width (beam width) is narrowed.

SUMMARY

An object of the present invention is to provide a data transmission apparatus using multiple antennas and beamforming.

Another object of the present invention is to provide a data reception apparatus using multiple antennas and beamforming.

Yet another object of the present invention is to provide a data transmission method using multiple antennas and beamforming.

Yet another object of the present invention is to provide a data reception method is using multiple antennas and beamforming.

Yet another object of the present invention is to provide a beamforming method of regularly maintaining a beam width.

In accordance with an aspect of the present invention, there is provided a transmission apparatus in a multiple antenna system. The transmission apparatus includes a modulator generating modulation symbols by performing constellation mapping on input bit, a precoding unit generating precoded symbols by multiplying the modulation symbols by a precoding matrix, and a plurality of transmission antennas sending the precoded symbols.

The plurality of transmission antennas is divided into two antenna groups, and the transmission antennas of a first antenna group are arrayed at a first distance one by one in a first direction. The transmission antennas of a second antenna group are arrayed at the first distance one by one in a second direction.

In accordance with another aspect of the present invention, there is provided user equipment in a multiple antenna system. The user equipment includes reception antennas receiving precoded symbols from a base station based on a precoding matrix, a de-precoding unit generating modulation symbols by multiplying the precoded symbols by an inverse precoding matrix, and a demodulator demodulating the modulation symbols.

Each of the elements of the precoding matrix is determined so that the user to equipment receives signals having the same phase on the same plane.

In accordance with yet another aspect of the present invention, there is provided a transmission method. The transmission method includes the steps of generating modulation symbols by performing constellation mapping on input bits, generating precoded symbols by multiplying the modulation symbols by a precoding matrix, and sending the precoded symbols to user equipment using a plurality of transmission antennas.

The plurality of transmission antennas is divided into two antenna groups, and each of the antenna groups forms a primary linear array in a direction where a signal will be transmitted. It is a principle that each of the antenna groups is disposed on the same plane as the direction where the signal will be transmitted. Furthermore, the antenna groups are disposed at an interval so that signals have different propagation paths when the signals are transmitted to the same user equipment.

Or, the plurality of transmission antennas is divided into two antenna groups, and the transmission antennas of a first antenna group are arrayed one by one at a first distance in a first direction. The transmission antennas of a second antenna group are arrayed one by one at the first distance in a second direction. The first direction and the second direction are parallel to each other and are placed on the same plane.

In accordance with yet another further aspect of the present invention, there is provided a method of receiving signals in a multiple antenna system. The method includes the steps of receiving precoded symbols from a base station based on a precoding matrix, generating modulation symbols by multiplying the precoded symbols by an inverse precoding matrix, and demodulating the modulation symbols.

Each of the elements of the precoding matrix is determined so that user equipment receives signals having the same phase on the same plane.

In accordance with yet another further aspect of the present invention, there is disclosed a transmission apparatus, including a modulator generating modulation symbols by performing constellation mapping on input bits, a precoding unit generating precoded symbols by multiplying the modulation symbols by a precoding matrix, and a plurality of transmission antennas sending the precoded symbols. The plurality of transmission antennas is divided into two antenna groups, the transmission antennas of a first antenna group can be arrayed at a first distance on a straight line, and the transmission antennas of a second antenna group may be arrayed at the first distance on a line parallel to the transmission antennas of the first antenna group.

In accordance with yet another further aspect of the present invention, there is disclosed a transmission method, including the steps of generating modulation symbols by performing constellation mapping on input bits, generating precoded symbols by multiplying the modulation symbols by a precoding matrix, and sending the precoded symbols to user equipment using a plurality of transmission antennas. The plurality of transmission antennas is divided into two antenna groups, the transmission antennas of a first antenna group can be arrayed at a first distance on a straight line, and the transmission antennas of a second antenna group may be arrayed at the first distance on a line parallel to the transmission antennas of the first antenna group.

In accordance with yet another further aspect of the present invention, there is provided a method of receiving signals in a multiple antenna system. The method includes the steps of receiving precoded symbols from a base station based on a precoding matrix, generating modulation symbols by multiplying the precoded symbols by an inverse precoding matrix, and demodulating the modulation symbols. The precoding matrix comprises a plurality of elements, and the values of the plurality of elements may be determined so that user equipment receives signals having the same phase on the same plane.

A constant beam width can be supported irrespective of an Angle of Departure, a power loss due to an angular spread can be prevented, and the occurrence of a shadow area in a great angle of departure can be solved.

DETAILED DESCRIPTION OF THE ILLUSTRATED EMBODIMENTS

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented by radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). UTRA is part of a Universal Mobile Telecommunications System (UMTS). $3^{rd}$ Generation Partnership Project (3GPP) Long Term Evolution (LTE) is part of an Evolved UMTS (E-UMTS) using E-UTRA, and 3GPP LTE adopts OFDMA in downlink and adopts SC-FDMA in uplink. LTE-Advanced (LTE-A) is the evolution of 3GPP LTE.

Figure 1:
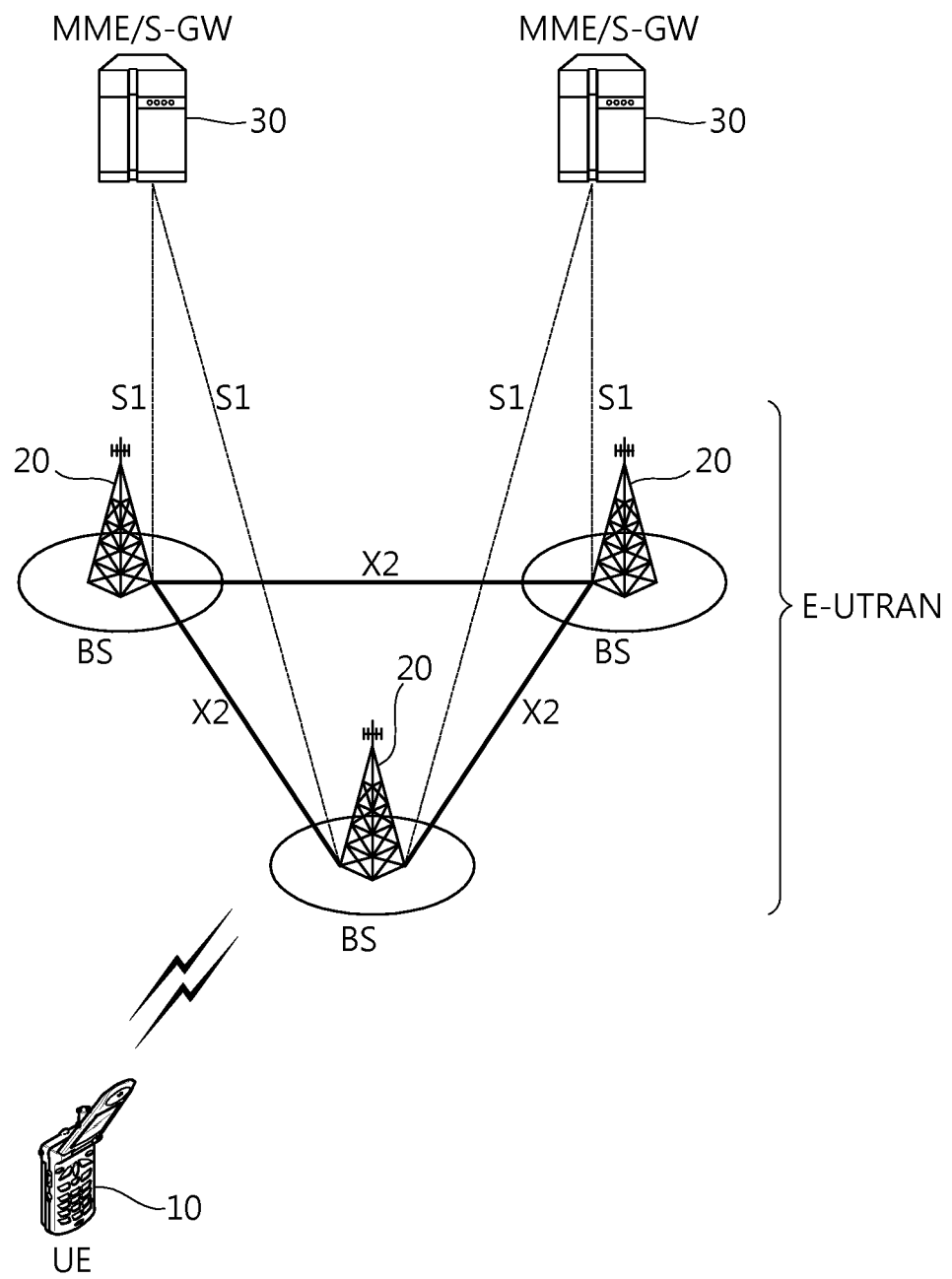
FIG. 1 is a block diagram showing a wireless communication system.

FIG. 1 is a block diagram showing a wireless communication system. This can be the network structure of an Evolved-Universal Mobile Telecommunications System (E-UMTS). The E-UMTS may also be called a Long Term Evolution (LTE) system. The wireless communication systems are widely deployed in order to provide various communication services, such as voice and packet data.

Referring to FIG. 1, an Evolved-UMTS Terrestrial Radio Access Network (E-UTRAN) includes a Base Station (BS) 20 providing a control plane and a user plane.

User Equipment (UE) 10 can be fixed or mobile and can also be called another terminology, such as a Mobile Station (MS), a User Terminal (UT), a Subscriber Station (SS), or a wireless device. The base station 20 commonly refers to a fixed station that communicates with the user equipment 10, and the base station 20 can also be called another terminology, such as an evolved-NodeB (eNB), a Base Transceiver System (BTS), or an access point. One base station 20 can provide service to at least one cell. An interface for user traffic or control traffic transmission may be used between the base stations 20. Hereinafter, downlink refers to communication from the base station 20 to the user equipment 10, and uplink refers to communication from the user equipment 10 to the base station 20. Downlink is also called a forward link, and uplink is also called a reverse link. In downlink, a transmitter can be part of the base station 20 and a receiver can be part of the user equipment 10. In uplink, a transmitter can be part of the user equipment 10 and a receiver can be part of the base station 20.

The base stations 20 can be interconnected through an X2 interface. The base station 20 is connected to an Evolved Packet Core (EPC), more particularly, a Mobility Management Entity (MME)/Serving Gateway (S-GW) 30 through an S1 interface. The S1 interface supports a many-to-many-relation between the base stations 20 and the MME/S-GW 30.

Multiple access schemes applied to the wireless communication system are not limited. The wireless communication system can be based on multiple access schemes, such as Code Division Multiple Access (CDMA), Time Division Multiple Access (TDMA), Frequency Division Multiple Access (FDMA), Single Carrier FDMA (SC-FDMA), Orthogonal Frequency Division Multiple Access (OFDMA), or known other modulation technologies. The modulation schemes increase the capacity of a communication system by demodulating signals received from multiple users of the communication system.

The layers of a radio interface protocol (radio interface protocol) between a user equipment and a network can be classified into a first layer L1, a second layer L2, and a third layer L3 on the basis of three lower layers of an Open System Interconnection (OSI) model that is widely known in communication systems. From among them, a physical layer belonging to the first layer provides information transfer service using a physical channel (physical channel), and a Radio Resource Control (hereinafter referred to as RRC) layer placed in the third layer functions to control radio resources between a user equipment and a network. To this end, RRC messages are exchanged between the user equipment and the network in the RRC layer.

There are some downlink physical control channels used in the physical layer. A Physical Downlink Control CHannel (PDCCH) informs a user equipment of the allocation of the resources of a PCH and a DownLink-Shared CHannel (DL-SCH) and Hybrid Automatic Repeat reQuest (HARQ) information related to a DL-SCH. The PDCCH can carry a downlink grant including control information related to downlink transmission to a user equipment and an uplink grant including control information related to uplink transmission. The control information regarding downlink transmission includes information about the allocation of resources, information about modulation and coding, information about an HARQ process, a new data indicator, information about a redundancy version, and information about power control. In a multiple antenna system, the control information about downlink transmission further includes information related to precoding.

Scheduling control information regarding uplink transmission includes information about the allocation of resources, hopping information, information about modulation and coding, information about an HARQ process, a new data indicator, information about a redundancy version, information about the resources of a reference signal for demodulation, and information about a Channel Quality Information (CQI) transmission request. In uplink transmission, if multiple antennas are supported, precoding-related information, such as downlink control information, can be transmitted.

Figure 2:
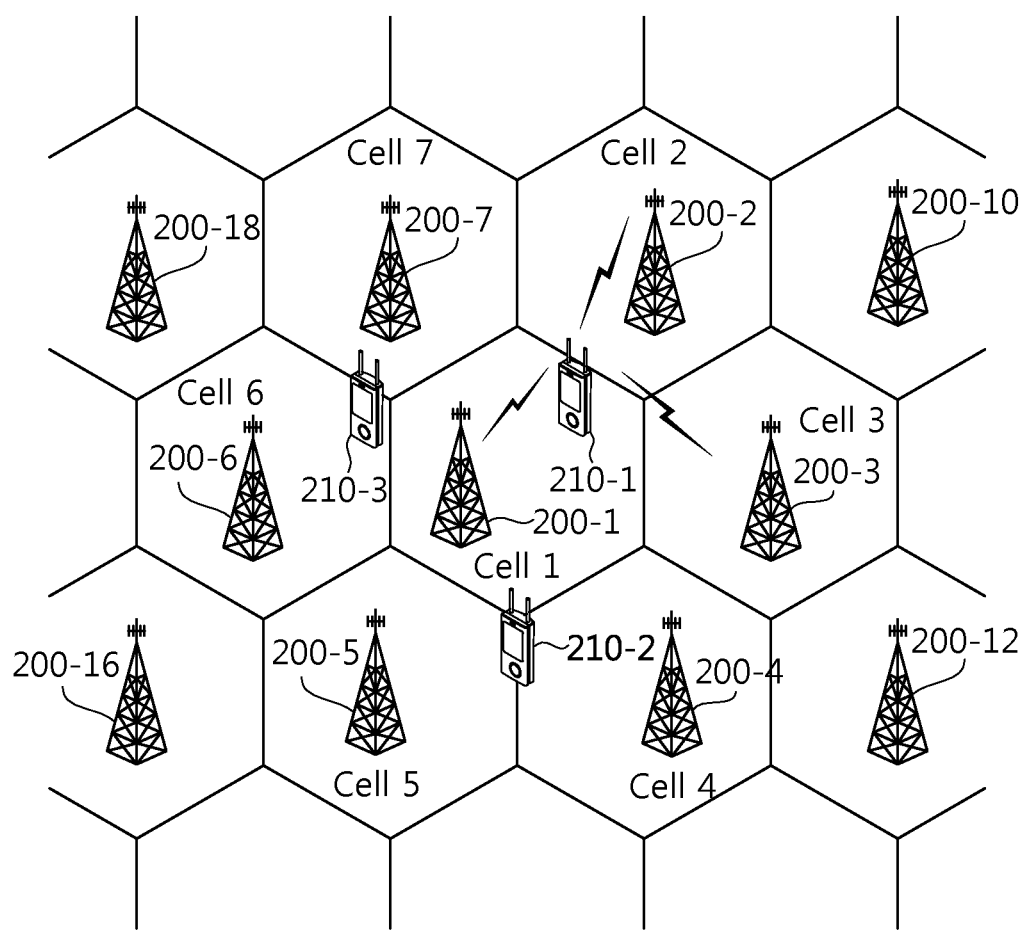
FIG. 2 is a diagram showing a wireless communication system in a multi-cell environment.

FIG. 2 is a diagram showing a wireless communication system in a multi-cell environment. In accordance with the diagram of FIG. 2, a user equipment performs communication with a plurality of cells in accordance with an inter-cell cooperative transmission scheme. The cooperative transmission method widely designates a method in which different multiple cells perform communication with a user equipment through cooperation. A plurality of cells that cooperate with each other is called cooperative cells, and a plurality of eNBs that cooperate with each other is called cooperative eNBs. The cooperative transmission method is also called a Coordinated Multiple Point (CoMP) transmission scheme in LTE-A. One eNB may control a plurality of cells, but it is hereinafter assumed that one eNB controls one cell, for convenience of description.

Cooperative eNBs basically include a main eNB and an auxiliary eNB. The main eNB is also called a serving eNB, and the auxiliary eNB is also called a neighboring eNB or another eNB. In a main eNB, not only downlink scheduling information for the user equipment in the main eNB, but downlink scheduling information for the user equipment in an auxiliary eNB can be transmitted. In an auxiliary eNB, downlink scheduling information for the user equipment may be transmitted or may not be transmitted.

In general, in a multi-cellular communication system, if communication between a base station and a user equipment is performed in each cell in the state in which a frequency reuse factor '1' is maintained in the same time and frequency band by not taking other cells into consideration, the performance of a user equipment placed close to a cell edge is greatly deteriorated due to interference from other cells.

Several schemes have been researched in order to overcome a phenomenon in which performance is deteriorated by this interference. If a cooperative transmission method between multiple cells is used as one of the schemes, the transfer rate of the entire system can be improved because the influence of interference is removed effectively.

Referring to FIG. 2, the wireless communication system includes a plurality of eNBs 200-1, 200-2, ... and a plurality of user equipments 210-1, 210-2, and 210-3. Each of the eNBs belongs to one cell. Each eNB includes one or a plurality of transmission antennas.

The user equipment 210-1 belongs to a first cell Cell1. Accordingly, the first cell Cell1 is a main cell or a serving cell, and the eNB 200-1 is a main eNB or a serving eNB. Meanwhile, the user equipment 210-1 is located at the boundary of the first cell Cell1, a second cell Cell2, and a third cell Cell3. Accordingly, not only the eNB 200-1, that is, the main eNB, but also the eNB 200-2 and the eNB 200-3, that is, auxiliary eNBs, can have a great influence on the user equipment 210-1. Accordingly, the eNB 200-1, the eNB 200-2, and the eNB 200-3 as cooperative eNBs cooperatively transmit data to the user equipment 210-1. In this case, the performance of the reception of the user equipment 210-1 can be improved because an interference signal is minimized.

If the cooperative eNBs cooperatively transmit data signals to the user equipment 210-1, signals transmitted by fourth, fifth, ..., $K^{th}$ eNBs become interference signals for the user equipment 210-1. An index set of a main eNB and an auxiliary eNB is S={1, 2, 3}, and the index set of a neighboring eNB that sends an interference signal can be represented by I={4, 5, ..., K}.

This is only an example in which a main eNB and an auxiliary eNB perform cooperative transmission to a user equipment placed at a cell edge, and the locations, the number, etc. of eNBs and cells that perform cooperative transmission are not limited. A cooperative eNB can be properly determined by taking a distance between a user equipment and a neighboring eNB, an SINR, and spectral efficiency into consideration.

Figure 3:
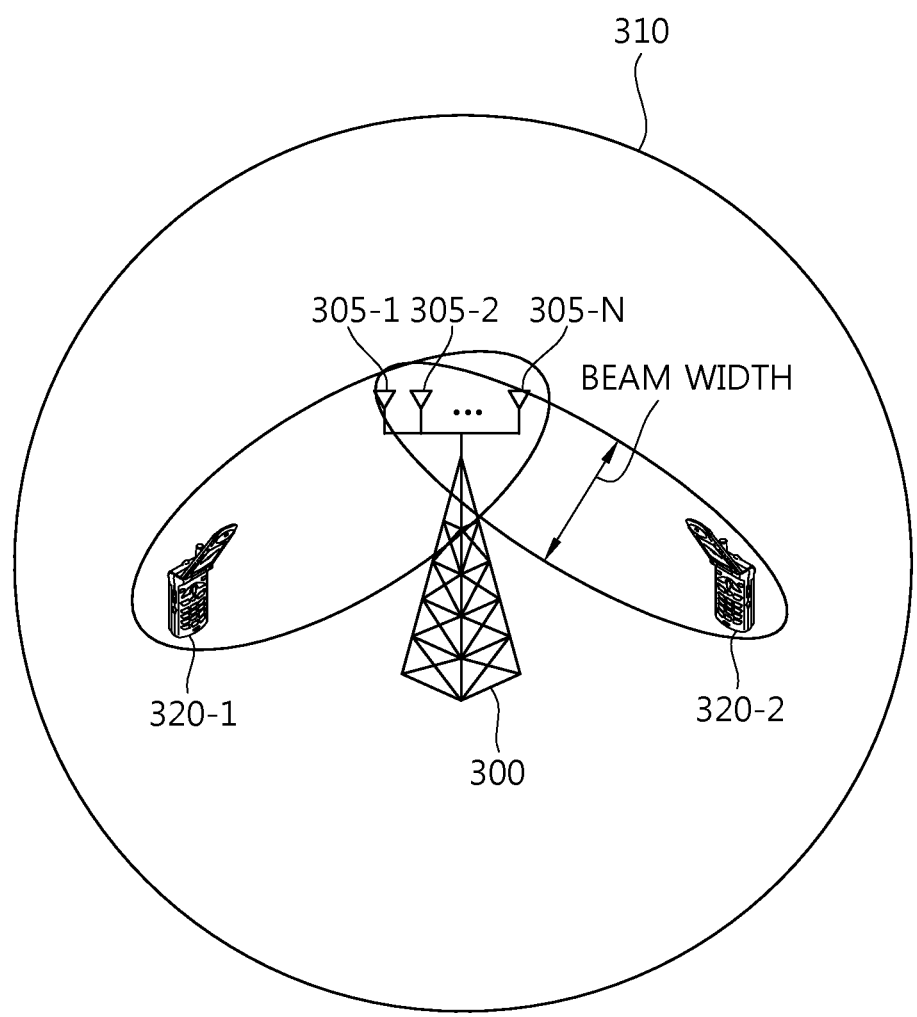
FIG. 3 is a conceptual diagram showing an example of a beamforming method using multiple antennas.

FIG. 3 is a conceptual diagram showing an example of a beamforming method using multiple antennas.

Referring to FIG. 3, an eNB 300 includes multiple antennas 305-1, 305-2, ..., 305-N and transmits a signal to user equipments 320-1 and 320-2 within a cell 310 on the basis of beamforming. In wireless communication, beamforming is an antenna implementation scheme in which energy radiated from an antenna is concentrically radiated in a specific direction. An object of beamforming is to receive a signal in a desired direction or to transfer a signal in a desired direction. In a multiple antenna system, if beamforming is used, performance can be increased because surrounding interference is removed by controlling the intensity of a signal depending on the location angles of the eNB 300 and the user equipments 320-1 and 320-2 through control of phase information for each antenna. A smart antenna can be implemented using the multiple antennas 305-1, 305-2, ..., 305-N in order to increase efficiency. Only two user equipments 320-1 and 320-2 are shown in FIG. 3, but this is only illustrative. Two or more user equipments or two or less user equipments can perform communication with the eNB 300 within the cell 310. FIG. 3 shows that the shape of a beam is changed depending on an angle of departure of an electric wave. This is described in detail with reference to simulation results of FIGS. 6 and 7.

The beam width of each beam formed depending on the location of a user equipment can be widely spread or narrowly predominant depending on an angle of departure.

Figure 4:
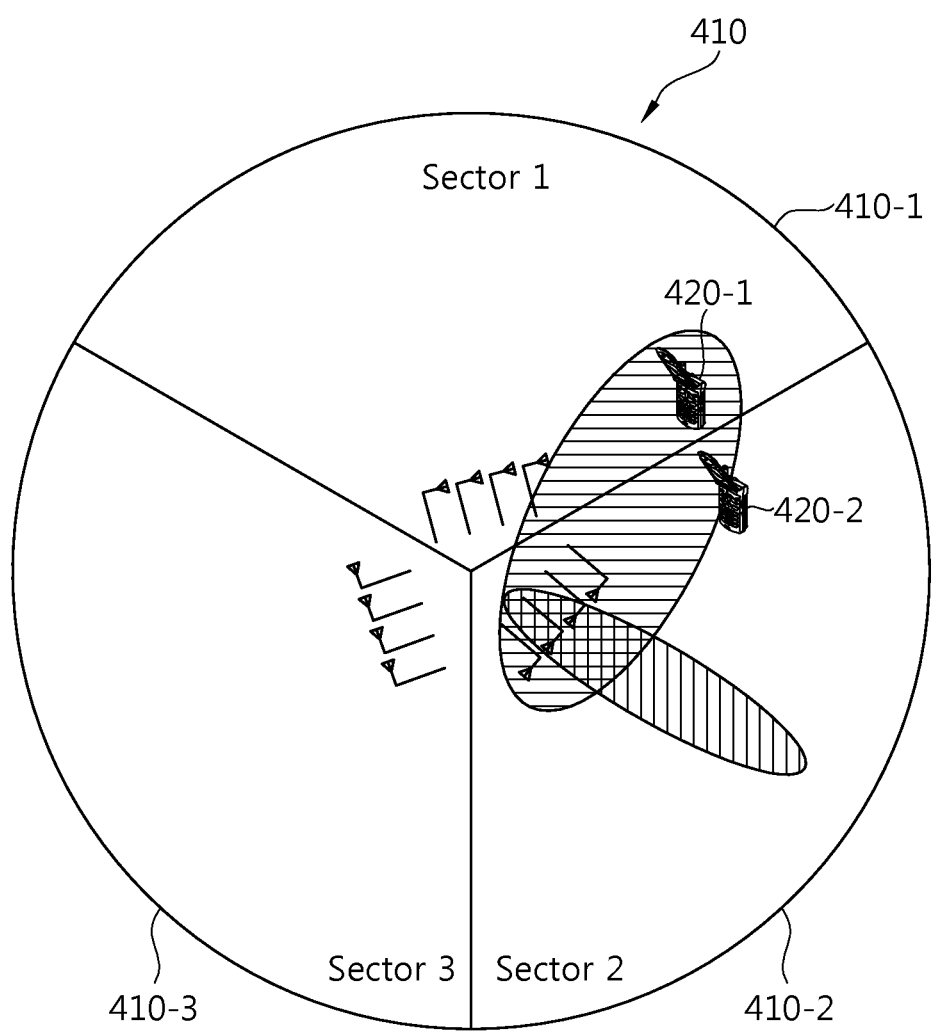
FIG. 4 is a conceptual diagram showing another example of a beamforming method using multiple antennas.

FIG. 4 is a conceptual diagram showing another example of a beamforming method using multiple antennas.

Referring to FIG. 4, a cell 410 is classified into a plurality of sectors 410-1, 410-2, and 410-3, and the antennas of each sector transmit signals on the basis of beamforming. A first user equipment 420-1 is located in the first sector 410-1, and a second user equipment 420-2 is located in the second sector 410-2. The first user equipment 420-1 and the second user equipment 420-2 perform communication based on different pieces of system information, different frequency bands, or different transmission parameters because they are located in different sectors. A linear array antenna responsible for each of the sectors 410-1, 410-2, and 410-3 does not transmit a signal to a user equipment located in another sector. If an inter-cell cooperative transmission and reception scheme is performed, however, the linear array antenna responsible for each of the sectors 410-1, 410-2, and 410-3 transmits a signal to a user equipment located in another sector by way of beamforming or precoding.

Here, the linear array antenna transmits a signal at a very great angle of departure. If a user equipment is located within a sector controlled by the linear array antenna, the linear array antenna transmits a signal to the user equipment by using a beam having a wider width. As a result, when an inter-cell cooperative transmission and reception scheme is performed, power received by the user equipment is reduced and interference is also generated over a wide area.

For example, it is assumed that the second sector 410-2 transmits a signal to the first user equipment 420-1 located in the first sector 410-1. Here, the width of a beam formed in the antenna of the second sector 410-2 is relatively wide as compared with a case where an angle of departure is 0°, and thus the beam acts as interference with the second user equipment 420-2 located in the second sector 410-2.

If the beam width of the signal of the second sector 410-2 is minutely controlled in order to remove this interference, the second user equipment 420-2 can deviate from the interference of the signal. To control the beam width minutely has the same concept as a concept that resolution is increased. There is a method of increasing the number of antenna as a method of minutely controlling the beam width. For example, if the existing four antennas are increased to eight antennas for beamforming, a beam width can become minute. In this case, however, a power loss can occur because the beam width becomes less than an angular spread unique to the beam.

The strength of a signal transmitted to a user equipment located at the edge of a sector can be weakened because the user equipment belongs to a shadow area. If a cooperative transmission scheme is applied to the user equipment, the strength of the signal received by the user equipment can be increased. This cooperative transmission scheme is called an intra-cell cooperative transmission scheme or an intra-cell CoMP scheme. In contrast, a plurality of eNBs performing wireless communication with a user equipment in accordance with a cooperative transmission scheme is called an inter-cell cooperative transmission scheme or an inter-cell CoMP scheme. In the case of the inter-cell cooperative transmission scheme, communication is performed through a very complicated step because pieces of channel information and/or control information about a plurality of eNBs must be shared. Furthermore, efficiency is limited because there is a possibility that transmission delay, etc. may occur. In contrast, in the intra-cell cooperative transmission scheme, communication can be performed without additional transmission delay in accordance with a relatively simple scheme because one eNB performs all control and a series of communication processes.

Figure 5:
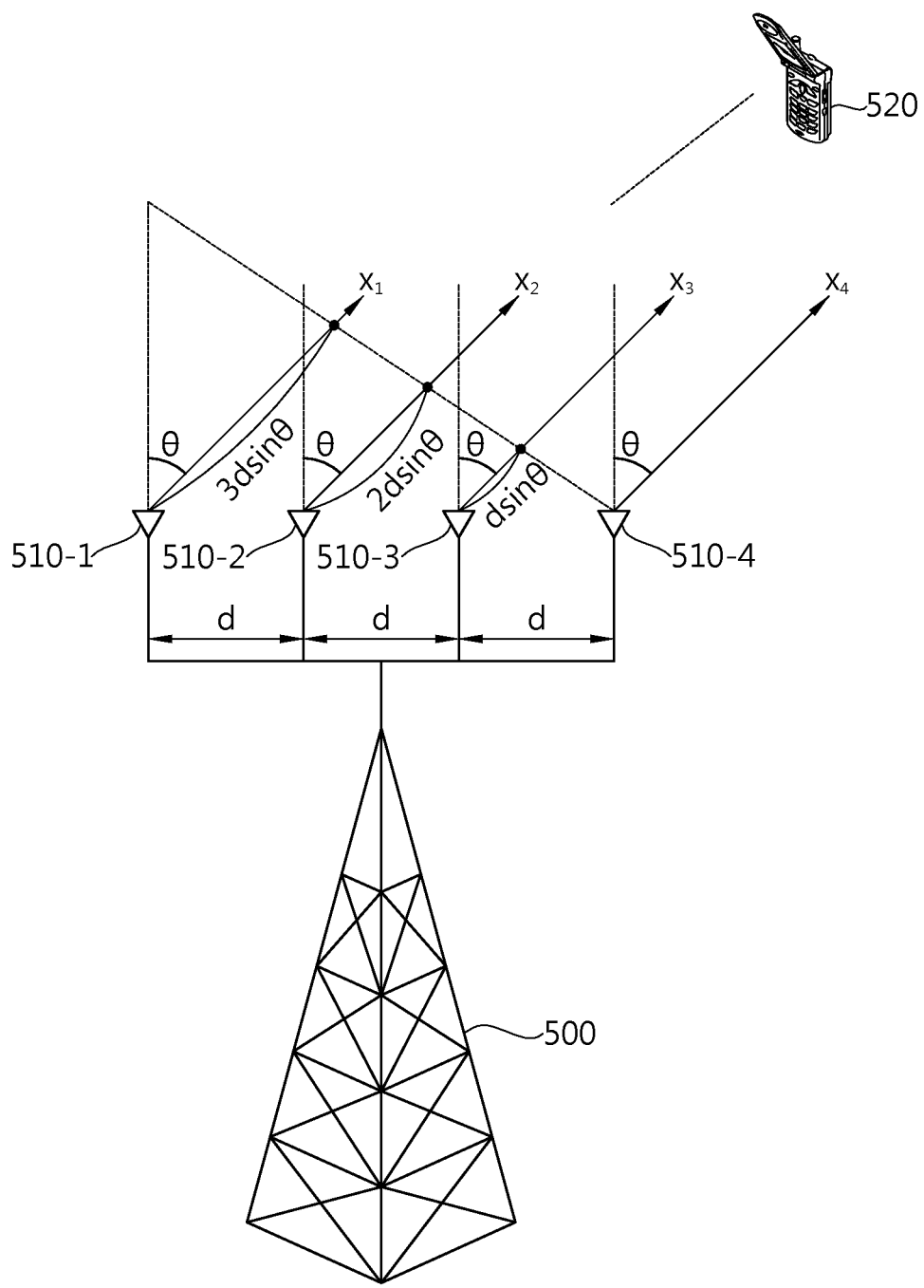
FIG. 5 is a diagram showing an antenna array for implementing beamforming and a difference in the distance of a propagation path between signals radiated by antennas when a signal is radiated at an angle of departure $\theta$.

FIG. 5 is a diagram showing an antenna array for implementing beamforming and a difference in the distance of a propagation path between signals radiated by antennas when a signal is radiated at an angle of departure θ.

Referring to FIG. 5, four antennas 510-1, 510-2, 510-3, and 510-4 are arrayed at a constant distance d on the same line in an eNB 500. This array is called a 1×4 linear array. The four antennas 510-1, 510-2, 510-3, and 510-4 are the antennas of a transmitter, and the transmitter may be part of a user equipment or part of an eNB. It is here assumed that the transmitter is part of the eNB 500, for convenience of description. Signals $x_1$, $x_2$, $x_3$, and $x_4$ transmitted by the four antennas 510-1, 510-2, 510-3, and 510-4 are signals that are relatively viewed by one user equipment 520 when all the signals reach the user equipment 520. Assuming that the user equipment 520 is located at a distance very far from the eNB in the state of Line of Sight (LoS), all angle of departure (AoD) at which the signals are propagated can be said to be θ identically. Here, the angle of departure is an angle formed by the path of each signal radiated toward the user equipment and a corresponding antenna.

From a standpoint of the user equipment, the signals $x_1$, $x_2$, $x_3$, and $x_4$ have the following characteristics. The phase of the signal $x_2$ leads the phase of the signal $x_1$ by d sin θ. Likewise, the phase of the signal $x_3$ leads the phase of the signal $x_2$ by d sin θ. From a standpoint of the signal $x_4$, the phases of the signals $x_1$, $x_2$, and $x_3$ lag by 3d sin θ, 2d sin θ, and d sin θ, respectively. That is, a constant phase difference is generated between the signals $x_1$, $x_2$, $x_3$, and $x_4$ received by the user equipment 520.

Accordingly, a method of multiplying a transmission symbol by a new beamforming matrix into which the distance d between the four antennas 510-1, 510-2, 510-3, and 510-4 and the angle of departure θ are incorporated so that the user equipment 520 can receive signals having the same phase and transmitting the transmission symbol can be taken into consideration. For example, a phase leading phenomenon occurring when the signal of each antenna reaches the user equipment 520 can be removed by dropping the signal of each antenna behind by a specific phase. In this case, the beamforming matrix V is equal to Equation 1 below.

$$V = \begin{bmatrix} 1 \\ e^{-jd\sin\theta} \\ e^{-j2d\sin\theta} \\ e^{-j3d\sin\theta} \end{bmatrix}$$ Equation 1

Referring to Equation 1, an element, that is, 1, within the beamforming matrix V is an element that sends a corresponding signal without change, and an element, that is, $e^{-jd\sin\theta}$, is an element that delays the phase of a corresponding signal by dsinθ. If the beamforming matrix V is used, a phase difference occurring between the signals of the antennas can be removed.

In this case, this may become phase leading or phase lagging depending on a signal, that is, a reference. If the phase of a signal relatively lags, a signal having the lagged phase can be added by a specific phase. Here, the beamforming matrix V has a different form.

If a beamforming matrix according to Equation 1 is used in relation to an inter-sector cooperative transmission and reception (intra-cell CoMP) scheme as described above, a beam width near the edge of a sector is spread relatively widely because the number of antennas is relatively small. In this case, there are problems in that interference between sectors is increased and a power loss is generated in a cell classified into sectors. For this reason, the number of antennas can be increased in order to make the beam width minute as described above, but this has another problem. This is described with reference to simulation results of FIGS. 6 and 7. Hereinafter, AoD means an angle of departure.

Figure 6:
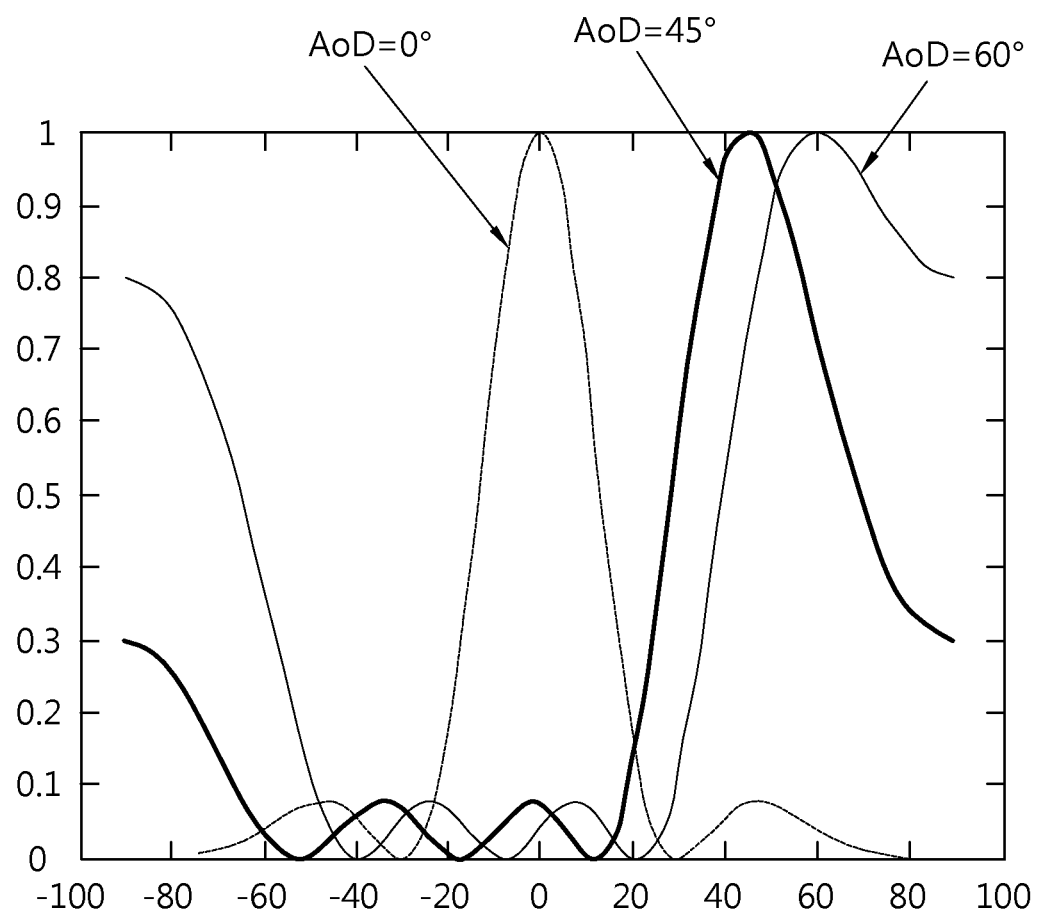
FIG. 6 is a simulation result showing the propagation patterns of actual signals at the time of beamforming using 4 linearly-arrayed transmission antennas.

FIG. 6 is a simulation result showing the propagation patterns of actual signals at the time of beamforming using 4 linearly-arrayed transmission antennas.

Referring to FIG. 6, an x axis is a beam width and a y axis is the intensity dB of a signal. As can be seen from this simulation result, the beam widths of signals when the angle of departures are 0°, 45°, and 60° are gradually increased. This means that there is a difference in the beam width depending on the angle of departure. In general, a beam width according to each angle of departure is wide, and the size of a beam width for each angle of departure is also not constant. The fact that the size of a beam width is wide and not constant indicates that there is a high probability that interference may occur.

Figure 7:
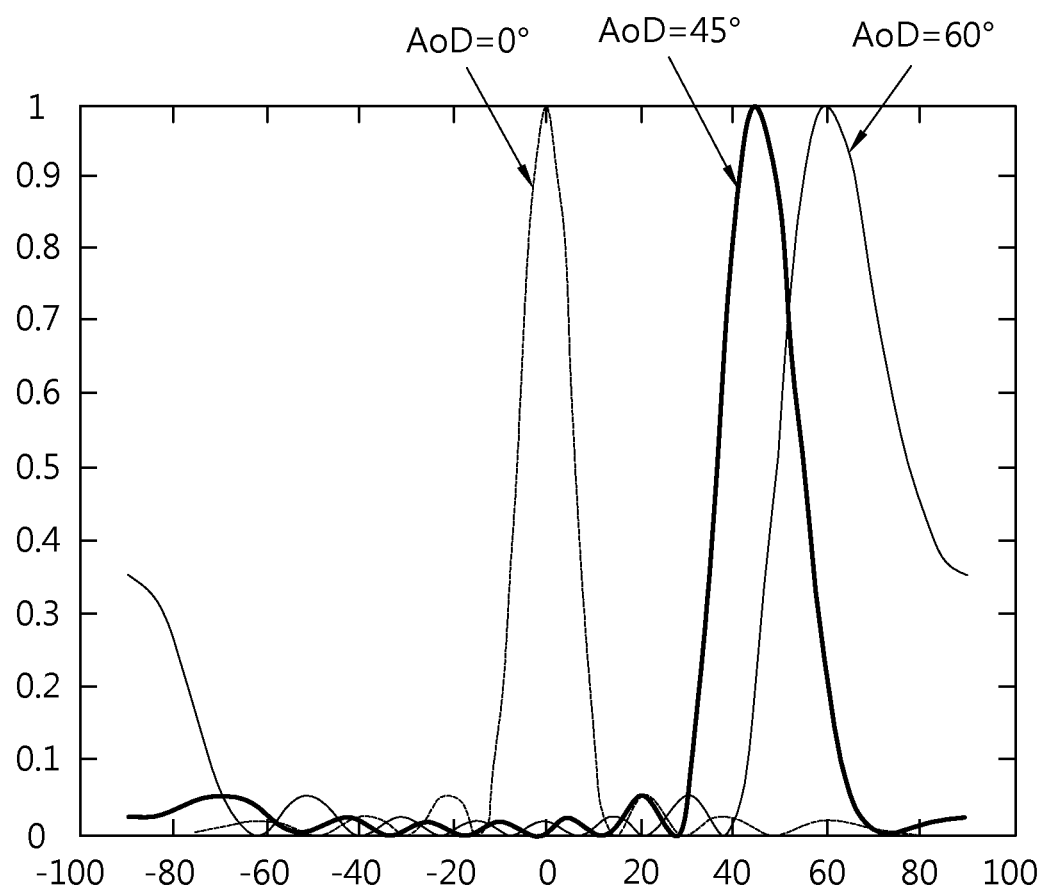
FIG. 7 is a simulation result showing the propagation patterns of actual signals at the time of beamforming using 8 linearly-arrayed transmission antennas.

FIG. 7 is a simulation result showing the propagation patterns of actual signals at the time of beamforming using 8 linearly-arrayed transmission antennas.

Referring to FIG. 7, an x axis is a beam width and a y axis is the intensity of a signal. As can be seen from this simulation result, the beam widths of signals when the angle of departures are 0°, 45°, and 60° are generally minute as compared with FIG. 6.

When a signal is transmitted to a user equipment requiring an angle of departure of about 0°, the signal is propagated with a very high resolution. In wireless communication, a signal is always propagated at an angular spread. If a beam width according to precoding is narrower than an angular spread, a power loss is generated because some of transmission power cannot be transferred to a user equipment. That is, in a linear array, interference is removed according to an increase in the number of antennas, but a power loss is generated in an angular spread environment.

Accordingly, there is a need for an antenna array and a beamforming matrix for preventing a power loss due to an angular spread and solving the occurrence of a shadow area in a great angle of departure by supporting a constant beam width irrespective of an angle of departure.

Figure 8:
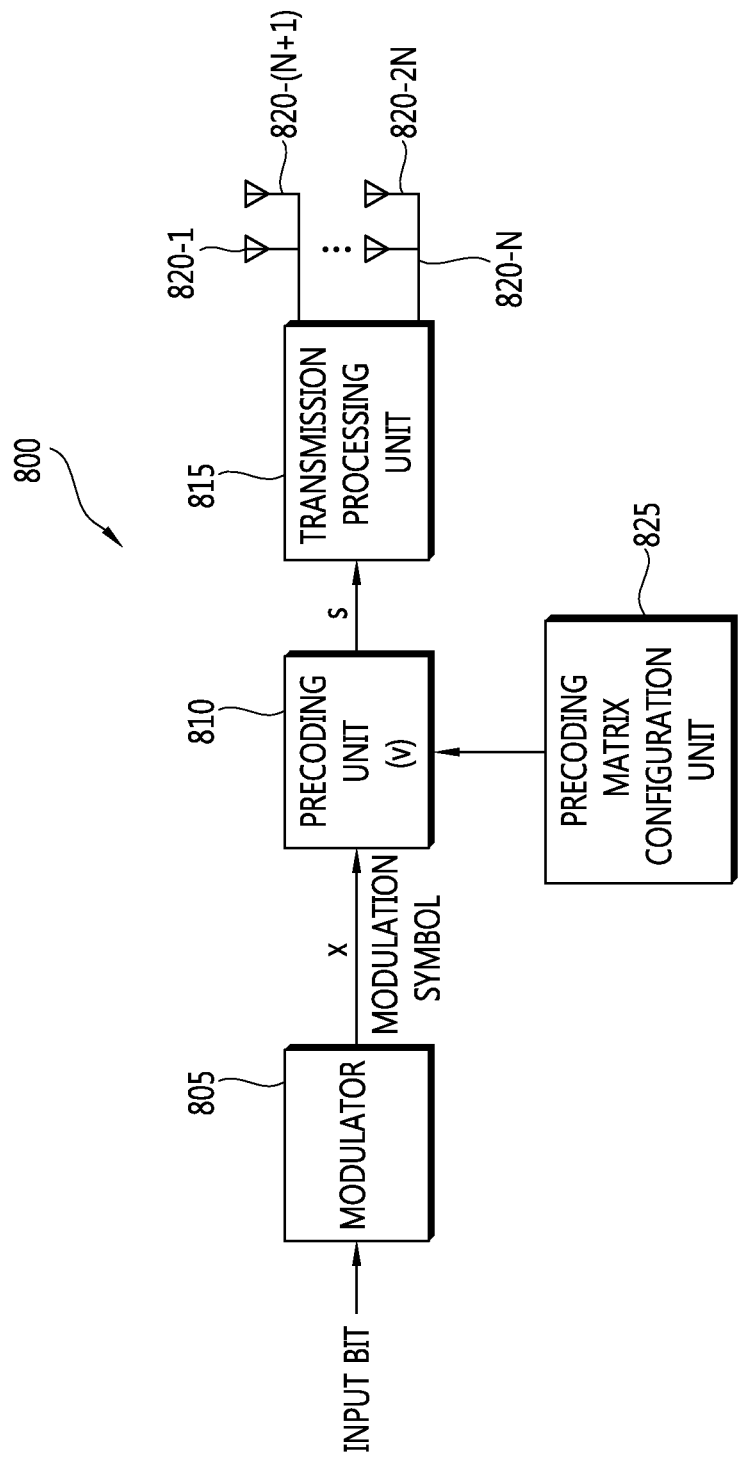
FIG. 8 is a block diagram showing a transmission apparatus including multiple antennas in accordance with an example of the present invention.

FIG. 8 is a block diagram showing a transmission apparatus including multiple antennas in accordance with an example of the present invention.

Referring to FIG. 8, the transmission apparatus 800 includes a modulation unit 805, a precoding unit 810, a transmission processing unit 815, a plurality of transmission antennas 820-1, 820-2, ..., 820-N, 820-(N+1), ..., 820-2N, and a precoding matrix configuration unit 825.

The modulator 805 generates a modulation symbol by performing constellation mapping on input bits. Here, the input bits can include control information related to the transmission of information about a user plane or the allocation of radio resources. Constellation mapping means the mapping of at least one input bit to one constellation point on a complex plane. For example, in Binary Phase Shift Keying (BPSK) modulation, 1 bit is mapped to 1 or −1 and in Quadrature Phase Shift Keying (QPSK) modulation, 2 bits are mapped to 1, j, −1, −j. Modulation includes 8PSK, 16 Quadrature Amplitude Modulation (QAM), etc. in addition to the BPSK and the QPSK.

The precoding unit 810 generates a precoded symbol by multiplying the modulation symbol by a precoding matrix configured by the precoding matrix configuration unit 825. The precoding matrix may also be called a beamforming vector. The precoded symbol can be generated in accordance with a scheme, such as Equation 2 below.

$$s = V \times x = \begin{bmatrix} v_1 \\ v_2 \\ \ldots \\ v_N \\ v_{N+1} \\ v_{N+2} \\ \ldots \\ v_{2N} \end{bmatrix} \times x = \begin{bmatrix} s_1 \\ s_2 \\ \ldots \\ s_N \\ s_{N+1} \\ s_{N+2} \\ \ldots \\ s_{2N} \end{bmatrix}$$ Equation 2

Here, x is a modulation symbol, V is a precoding matrix of 2N×1, and s is a precoded symbol. The precoding matrix V consists of 2N elements. Furthermore, each of the elements of the precoding matrix V has a phase having a specific pattern depending on an array of the plurality of transmission antennas 820-1, 820-2, ..., 820-N, 820-(N+1), ..., 820-2N.

The transmission processing unit 815 generates a transmission symbol by performing an OFDM modulation scheme or an SC-FDMA modulation scheme on the precoded symbol. The transmission symbol can be an OFDM symbol or an SC-FDMA symbol. The transmission processing unit 815 generates the OFDM symbol by performing Fast Fourier Transform (FFT) on the precoded symbol in the frequency domain and then performing Inverse FFT (IFFT) on the resulting symbol in the time domain. Or, the transmission processing unit 815 generates the SC-FDMA symbol by performing Discrete Fourier Transform (DFT) on the precoded symbol in the frequency domain and then performing IFFT on the resulting symbol in the time domain.

The plurality of transmission antennas 820-1, 820-2, ..., 820-N, 820-(N+1), ..., 820-2N transmit the transmission symbol to a reception apparatus. Here, the plurality of transmission antennas 820-1, 820-2, ..., 820-N, 820-(N+1), ..., 820-2N can be classified into some antenna groups depending on an array pattern. For example, the plurality of transmission antennas 820-1, 820-2, ..., 820-N, 820-(N+1), ..., 820-2N is divided into two antenna groups. This is described in more detail with reference to FIG. 9.

Figure 9:
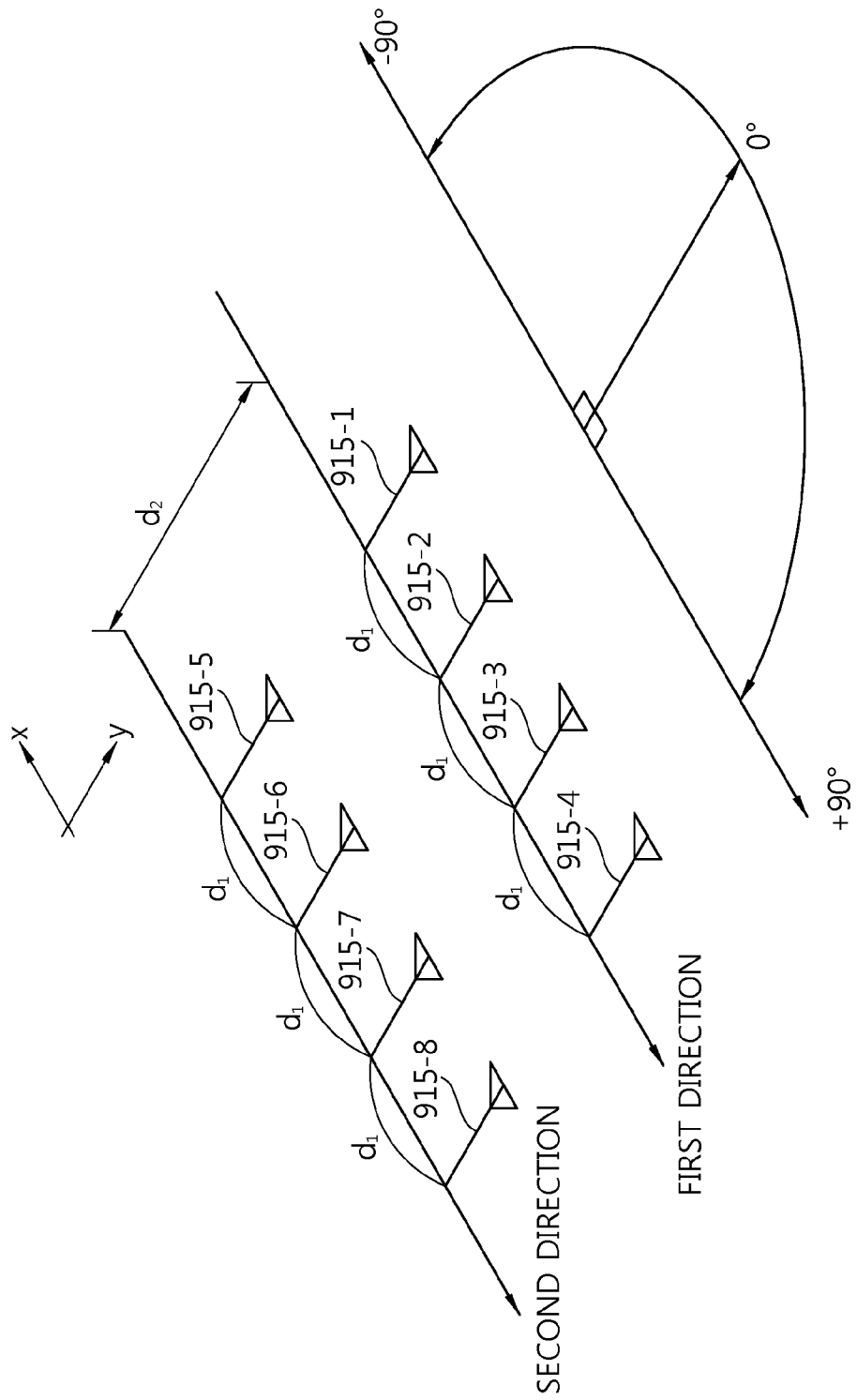
FIG. 9 is a diagram showing an array of transmission antennas according to two antenna groups in accordance with an example of the present invention.

FIG. 9 is a diagram showing an array of transmission antennas according to two antenna groups in accordance with an example of the present invention. It is assumed that the number of transmission antennas per antenna group is N=4, for convenience of description.

Referring to FIG. 9, a first antenna group includes transmission antennas 915-1, 915-2, 915-3, and 915-4, and a second antenna group includes transmission antennas 915-5, 915-6, 915-7, and 915-8. The array of the transmission antennas is called a 2×4 linear array, a 2-D array, or a plane array.

The transmission antennas 915-1, 915-2, 915-3, and 915-4 of the first antenna group are arrayed at a first distance $d_1$ in a first direction, and the transmission antennas 915-5, 915-6, 915-7, and 915-8 of the second antenna group are arrayed at the first distance $d_1$ in a second direction. Here, the first direction and the second direction are parallel to each other and placed on the same plane. Furthermore, the distance $d_2$ between the transmission antennas 915-1, 915-2, 915-3, and 915-4 of the first antenna group and between the transmission antennas 915-5, 915-6, 915-7, and 915-8 of the second antenna group is constant. The angle of departure of a beam formed by each antenna group is theoretically −90° to 0° to 90° on the same plane.

Although N=4 and only the two antenna groups are illustrated in FIG. 9, the technical spirit of the present invention can also be applied to two or more antenna groups as well as a case of N>4.

Referring back to FIG. 8, the precoding matrix configuration unit 825 configures a precoding matrix to be used in precoding for the modulation symbol with reference to an array of the plurality of transmission antennas. The configuration of the precoding matrix means a process of determining each of the elements of the precoding matrix. More particularly, the configuration of the precoding matrix means a process of controlling the phase component of each of the elements. The precoding matrix configuration unit 825 can determine each of the elements of the precoding matrix V so that the first antenna group 820-1, 820-2, ..., 820-N and the second antenna group 820-(N+1), ..., 820-2N can transmit a signal having the same phase to a user equipment on the same plane. For convenience of description, FIG. 10 shows a method of the precoding matrix configuration unit 825 configuring each of the elements of the precoding matrix V when a signal is transmitted in an array of antenna groups as in FIG. 9.

Figure 10:
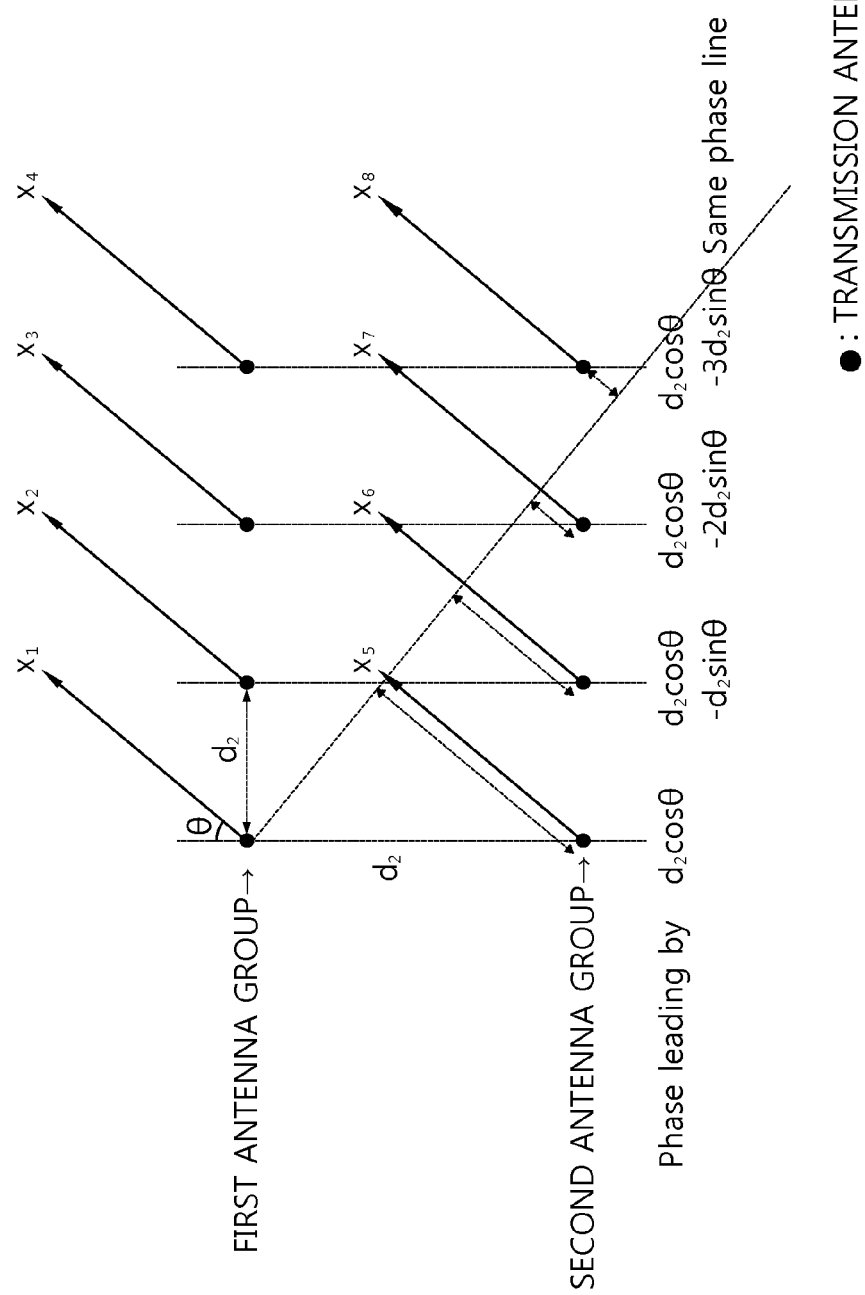
FIG. 10 shows a method of configuring each of the elements of a precoding matrix in accordance with an example of the present invention.

Referring to FIG. 10, it is assumed that all the transmission antennas belonging to the first antenna group and the second antenna group transmit the same signal x. The phase of the signal x controlled by a user equipment is changed depending on that the signal x is transmitted through what transmission antennas. It is assumed that a signal that reaches a user equipment after the same signal x is changed by a phase $p_k$ when the same signal x is transmitted through a $k^{th}$ transmission antenna is $x_k$.

[95] Signals transmitted by the respective transmission antennas of the first antenna group are $x_1, x_2, x_3$, and $x_4$. The phases of the signals $x_1, x_2$, and $x_3$ lag by $3d_1 \sin \theta$, $2 d_1 \sin \theta$, and $d_1 \sin \theta$, respectively, on the basis of the signal $x_4$. Here, θ is an angle of departure, that is, an angle formed by a signal, transmitted to a user equipment through a transmission antenna, and the transmission antenna.

Meanwhile, signals transmitted by the respective transmission antennas of the second antenna group are $x_5, x_6, x_7$, and $x_8$. The phases of the signals $x_5, x_6, x_7$, and $x_8$ lag by $d_2 \cos \theta$, $d_2 \cos \theta - d_1 \sin \theta$, $d_2 \cos \theta - 2d_1 \sin \theta$, and $d_2 \cos \theta - 3d_1 \sin \theta$, respectively, on the basis of the signal $x_4$.

That is, the phase difference $d_2 \cos \theta$ is additionally generated in the signals of the second antenna group because the second antenna group is spaced apart from the first antenna group by the specific distance d. It can be seen that a sin component is dominant in a phase difference between transmission antennas within the same antenna group, but a cos component is additionally generated in a phase difference between different antenna groups.

An user equipment has to receive the signal x, but signals actually received by the user equipment are $x_1, x_2, x_3, x_4, x_5, x_6, x_7$, and $x_8$, that is, signals having different phases. If a phase difference between the signals becomes 180°, the phase difference becomes 0 because the is signals are offset. In this case, although an eNB transmits a signal, a user equipment cannot detect the signal. In order to prevent this problem, a phase difference must be properly compensated for. That is, a signal phase difference between transmission antennas within the same group and a signal phase difference between transmission antennas between different groups must be compensated for. This can be solved by adding a phase component to each of the elements of the precoding matrix V as in Equation 3.

$$s = Vx = \begin{bmatrix} 1 \\ e^{-jd_1 \sin\theta} \\ e^{-j2d_1 \sin\theta} \\ e^{-j3d_1 \sin\theta} \\ e^{d_2 \cos\theta} \\ e^{d_2 \cos\theta - jd_1 \sin\theta} \\ e^{d_2 \cos\theta - j2d_1 \sin\theta} \\ e^{d_2 \cos\theta - j3d_1 \sin\theta} \end{bmatrix} \times x \quad \text{Equation 3}$$

Referring to Equation 3, the phase component of each of the elements of the precoding matrix is a function of an angle of departure θ, a value $d_1$ of the distance between transmission antennas within the same antenna group, and a value $d_2$ of the distance between different antenna groups. Accordingly, the precoding matrix configuration unit 825 must know information about the distance of the transmission antennas and information about the angle of departure in advance or receive the piece of information. Meanwhile, in the precoding matrix V, it is assumed that the angle of departure of a beam formed by each antenna group is defined as a horizontal component on the same plane and a range thereof is −60°~0°~+60°. When a vertical component of the angle of departure of the beam is taken into consideration, the precoding matrix V must be configured by taking an angle τ of the vertical component into consideration. This is described later.

Each of the elements of the precoding matrix V corresponds to one transmission antenna. An element of a first row is 1, and so this means that additional phase correction is not performed on the signal $x_1$ transmitted through the first transmission antenna. Meanwhile, an element of a second row is $e^{-jd_1 \sin\theta}$. That is, the precoding matrix configuration unit 825 applies phase correction as much as $-d_1 \sin\theta$ to the original signal $x_2$. Thus, a phase of the signal $x_2$ when the signal $x_2$ reaches a user equipment after experiencing precoding becomes identical with that of the signal $x_1$. Furthermore, an element of a sixth row is $e^{d_2 \cos\theta - jd_1 \sin\theta}$. That is, the precoding matrix configuration unit 825 applies phase correction as much as $d_2 \cos\theta - jd_1 \sin\theta$ to the original signal $x_6$. Thus, a phase of the signal $x_6$ when the signal $x_6$ reaches a user equipment after experiencing precoding becomes identical with that of the signal $x_1$. In accordance with this method, each of the signals $x_1, x_2, x_3, x_4, x_5, x_6, x_7$, and $x_8$ can be considered as a signal having the same phase from a standpoint of a user equipment.

In Equation 3, the precoding matrix has been configured according to a scheme for delaying the phases of the remaining signals because the phases of the remaining signals lead the phase of the signal $x_1$. If phase correction is performed based on another signal (e.g., the signal $x_4$), the precoding matrix must be configured using a scheme for leading the phases of the remaining signals. Each of the elements of the precoding matrix may be subject to phase leading or phase lagging depending on that a phase is determined based on what signal as described above.

If an array state of a plurality of transmission antennas and the precoding matrix V of Equation 3 for correcting the phase of each of the transmission antennas are used as described above, a beam width formed in the plurality of transmission antennas can remain constant over the entire angle of departure. For example, if transmission antennas are arrayed so that each of $d_1$ and $d_2$ is smaller than a threshold a, a beam width can remain in a level smaller than a specific angle. Accordingly, a beam formed for a specific user equipment does not generate interference with a signal from another cell or sector and can also reduce a loss of power.

Figure 11:
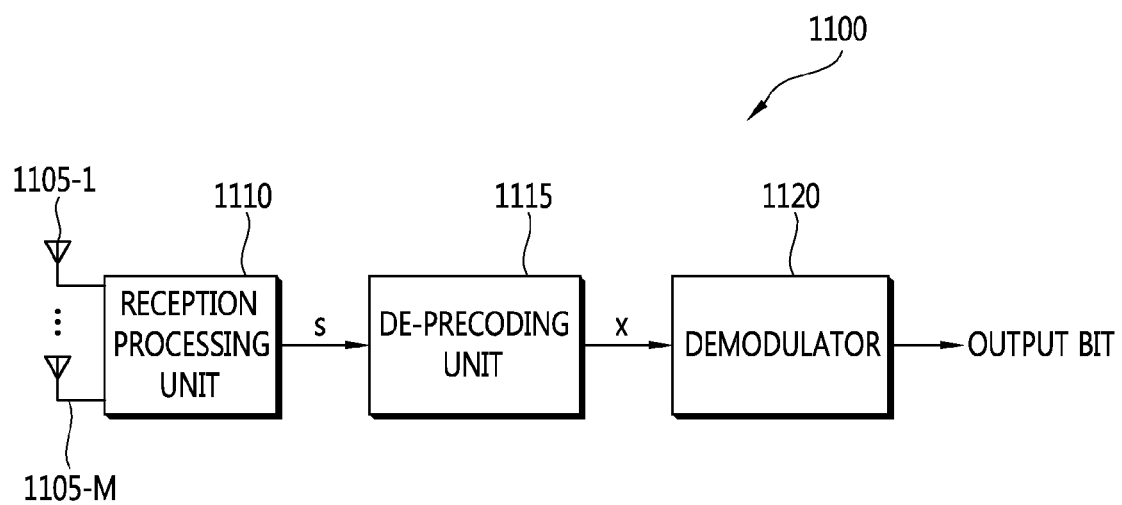
FIG. 11 is a block diagram showing a reception apparatus in accordance with an example of the present invention.

FIG. 11 is a block diagram showing a reception apparatus in accordance with an example of the present invention.

Referring to FIG. 11, the reception apparatus 1100 includes a plurality of reception antennas 1105-1, . . . , 1105-M, a reception processing unit 1110, a de-precoding unit 1115, and a demodulator 1120.

The plurality of reception antennas 1105-1, . . . , 1105-M receives a radio signal from a transmission apparatus. The radio signal includes a transmission symbol, and the transmission symbol can be an OFDM symbol or an SC-FDMA symbol. If a plurality of transmission antennas transmits the radio signal by way of beamforming, the radio signal can include a plurality of signals and the plurality of signals has the same phase by way of phase correction from a viewpoint of the reception apparatus 1100.

The reception processing unit 1110 extracts a precoded symbol by performing OFDM demodulation or SC-FDMA demodulation on the transmission symbol. OFDM demodulation is achieved by IFFT and FFT performed on the transmission symbol. SC-FDMA demodulation is achieved by IFFT and DFT performed on the transmission symbol.

The de-precoding unit 1115 extracts a modulation symbol by multiplying the precoded symbol by an inverse precoding matrix.

The demodulator 1120 extracts output bits by performing demodulation on the modulation symbol.

The reception apparatus 1100 can receive a signal having the same phase from a plurality of transmission antennas by way of a series of the processes.

A precoding matrix into which the 2-D array of the transmission antennas according to the present invention and the 2D array structure are incorporated can show a more excellent advantage, in particular, in a Coordinated Multiple Point transmission and reception system. In a Coordinated Multiple Point transmission and reception system, a user equipment located at a cell edge receives beams from both cells. Here, if a beam width is unnecessarily wide, another user equipment that does not need to receive the beam is subject to interference resulting from the beam. The same principle applies to a case where one cell is classified into sectors and both sectors transmit beams to a user equipment located at a sector edge. In accordance with the present invention, however, beams transmitted by a plurality of transmission antennas almost do not have a difference in the beam width when an angle of departure is 60° and when an angle of departure is 0°.

The reason why there is no significant difference in the beam width depending on the size of an angle of departure as described above is that the phase component of each of elements belonging to a precoding matrix V consists of a sin component and a cos component. When the angle of departure θ increases, a change of the sin component is relatively small and a change of the cos component becomes great. In contrast, when the angle of departure θ decreases, a change of the cos component is relatively small and a change of the sin component becomes great. According to this principle, the beam width can remain constant irrespective of the angle of departure.

Figure 12:
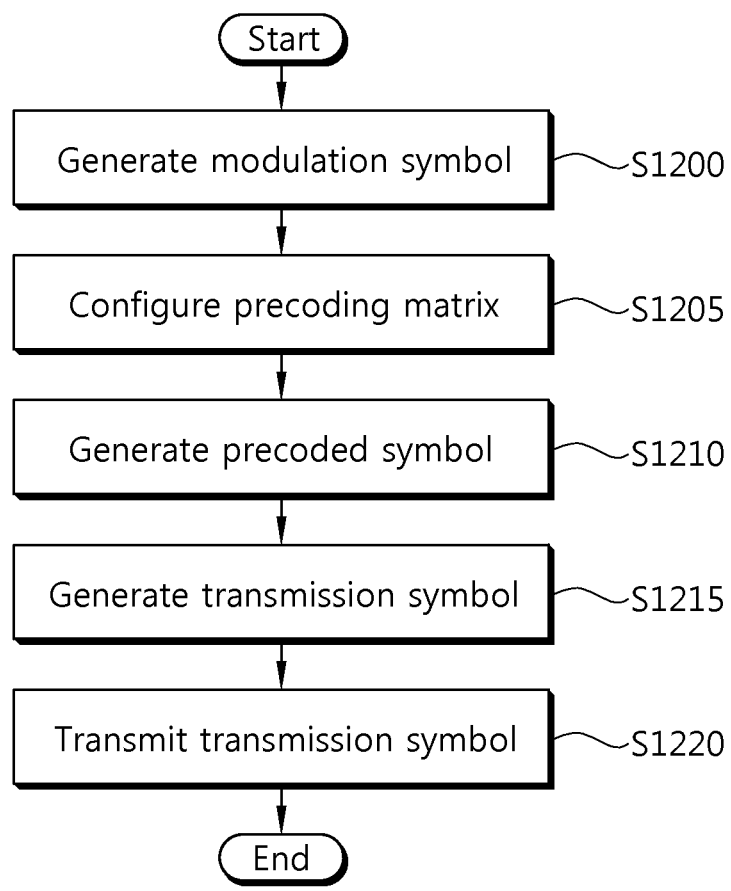
FIG. 12 is a flowchart illustrating a method of an eNB transmitting a signal by using a plurality of transmission antennas in accordance with an example of the present invention.

FIG. 12 is a flowchart illustrating a method of an eNB transmitting a signal by using a plurality of transmission antennas in accordance with an example of the present invention.

Referring to FIG. 12, the eNB generates a modulation symbol by modulating input bits (S1200). The eNB configures a precoding matrix that will be used in precoding for the modulation symbol (S1205). The size of the precoding matrix is determined depending on the number of transmission antennas. For example, if the number of transmission antennas is N, the size of the precoding matrix is N×M. Here, M can be the number of layers or the number of ranks that are inputted to the precoding matrix. Each of elements that form the precoding matrix includes a phase component for controlling the phases of signals radiated from a plurality of transmission antennas to a user equipment so that the signals have the same phase. The phase component is determined based on an arrangement of a plurality of transmission antennas included in an eNB. Accordingly, if the precoding matrix is N×1, N precoded symbols having different phase components are generated.

The eNB generates a precoded symbol by multiplying the modulation symbols by the configured precoding matrix (S1210).

The eNB generates a transmission symbol by performing OFDM modulation or SC-FDMA modulation on the precoded symbol (S1215). The transmission symbol can be an OFDM symbol or an SC-FDMA symbol. If the number of precoded symbols is N, N transmission symbols are also generated. The N transmission symbols are transmitted through N transmission antennas, respectively.

The eNB transmits the transmission symbol to a user equipment through a plurality of transmission antennas (S1220). The plurality of transmission antennas is divided into two antenna groups. The transmission antennas of a first antenna group are arrayed at a first distance one by one in a first direction, and the transmission antennas of a second antenna group are arrayed at the first distance one by one in a second direction. The first direction and the second direction are parallel to each other and located on the same plane. An angle formed by signals, radiated from the plurality of transmission antennas, and the user equipment is called an angle of departure, the phase component is determined by the angle of departure, and the phase component determines the elements of the precoding matrix. Accordingly, the precoding matrix corrects the phase of the transmission symbol.

Figure 13:
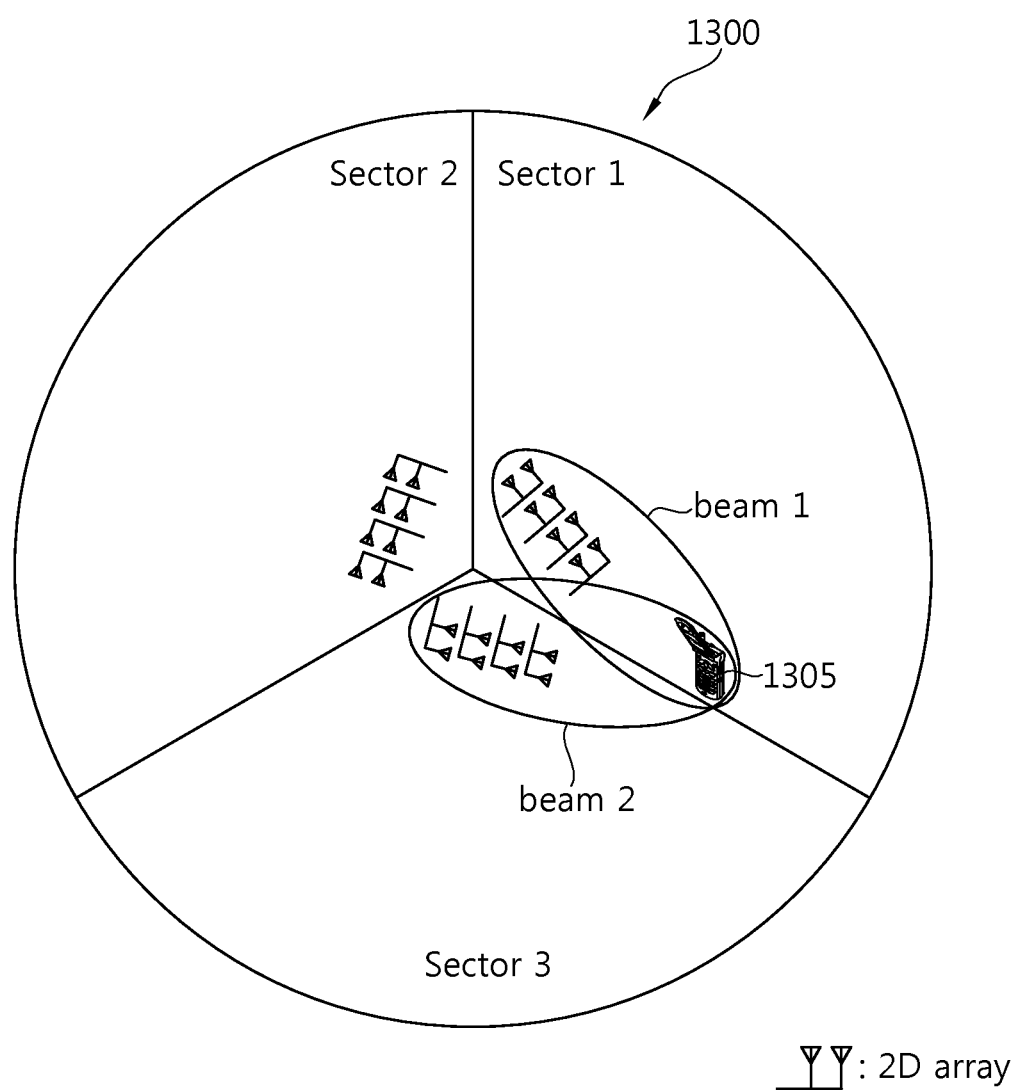
FIG. 13 is a conceptual diagram showing an example of a beamforming method using multiple antennas in accordance with the present invention.

FIG. 13 is a conceptual diagram showing an example of a beamforming method using multiple antennas in accordance with the present invention. This is a beamforming method according to an intra-cell cooperative transmission scheme.

Referring to FIG. 13, a cell 1300 is classified into a first sector Sector 1, a second sector Sector 2, and a third sector Sector 3. An user equipment 1305 is located near the edge of the first sector, and it receives signals from the first sector and the third sector in accordance with an intra-cell cooperative transmission scheme. Both a first beam beam 1 formed by the transmission antennas of the first sector and a second beam beam 2 formed by the transmission antennas of the third sector face the user equipment 1305.

Here, the first beam and the second beam form an angle of departure of 60° or higher along with the transmission antennas of the sectors. Nevertheless, a power loss is not generated because the beam width remains constant without being widened, and thus most of transmission power is transferred to the user equipment without change. Furthermore, a problem in which a shadow area due to interference is generated near the edge of the sector is also solved.

Here, the angle of departure is formed on the same plane as the first antenna group and the second antenna group of each sector. However, a transmission antenna is commonly located at a higher altitude than a user equipment. Accordingly, the angle of departure of a beam formed by a transmission antenna includes not only a horizontal component θ, that is, an angle on the same plane, but also a vertical component τ. Here, assuming that the user equipment is located far away from the transmission antenna, the vertical component τ will be almost close 0° and thus the user equipment can be considered to be located on the same plane. Thus, in the above-described precoding matrix, it is assumed that the vertical component τ≈0. For finer phase control, the beam of the transmission antenna is formed as in FIG. 14 when the vertical component of the angle of departure is taken into consideration.

Figure 14:
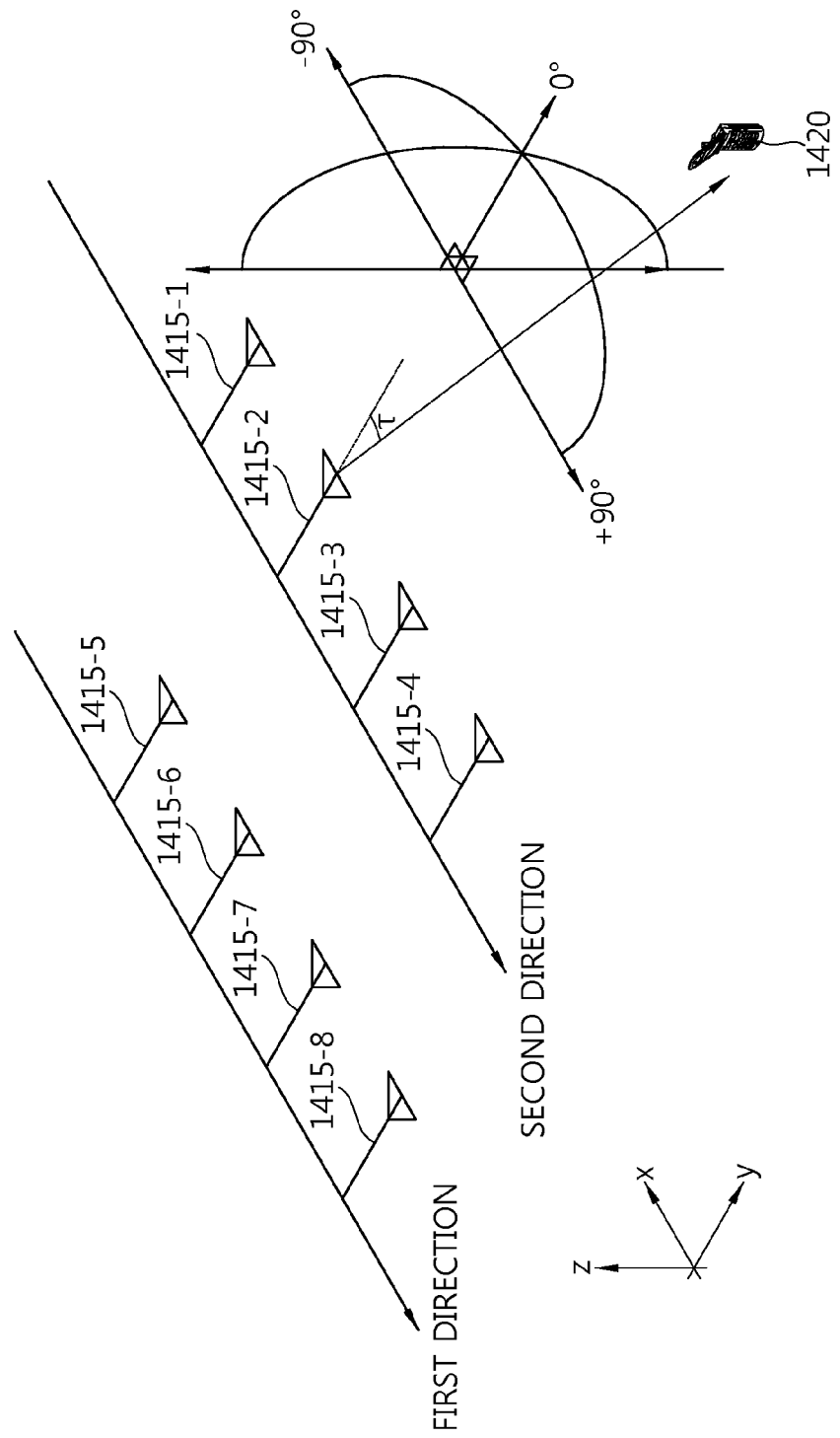
FIG. 14 is a diagram showing an array of transmission antennas according to two antenna groups in accordance with another example of the present invention.

FIG. 14 is a diagram showing an array of transmission antennas according to two antenna groups in accordance with another example of the present invention. It is assumed that N=4, for convenience of description.

Referring to FIG. 14, the phase components of a precoding matrix can be defined as in Equation 4 below according to the vertical component τ of an angle of departure formed by a user equipment 1420 and 2-D arrayed transmission antennas 1415-1, 1415-2, . . . , 1415-8.

$$V = \begin{bmatrix} 1 \\ e^{-jd_1\sin\theta} \\ e^{-j2d_1\sin\theta} \\ e^{-j3d_1\sin\theta} \\ e^{\tau+d_2\cos\theta} \\ e^{\tau+d_2\cos\theta-jd_1\sin\theta} \\ e^{\tau+d_2\cos\theta-j2d_1\sin\theta} \\ e^{\tau+d_2\cos\theta-j3d_1\sin\theta} \end{bmatrix} \quad \text{Equation 4}$$

The vertical component τ is an offset parameter for correcting a phase difference between the signals transmitted by the respective 2-D arrayed transmission antennas 1415-1, 1415-2, . . . , 1415-8 and is differently set for each user equipment 1420.

If the distance between the user equipment 1420 and the 2-D arrayed transmission antennas 1415-1, 1415-2, . . . , 1415-8 is very large as described above, however, the vertical component τ is small enough to be disregarded. Accordingly, since the vertical component τ≈0 in most cases, there is a good possibility that the precoding matrix can be given like Equation 3.

Figure 15:
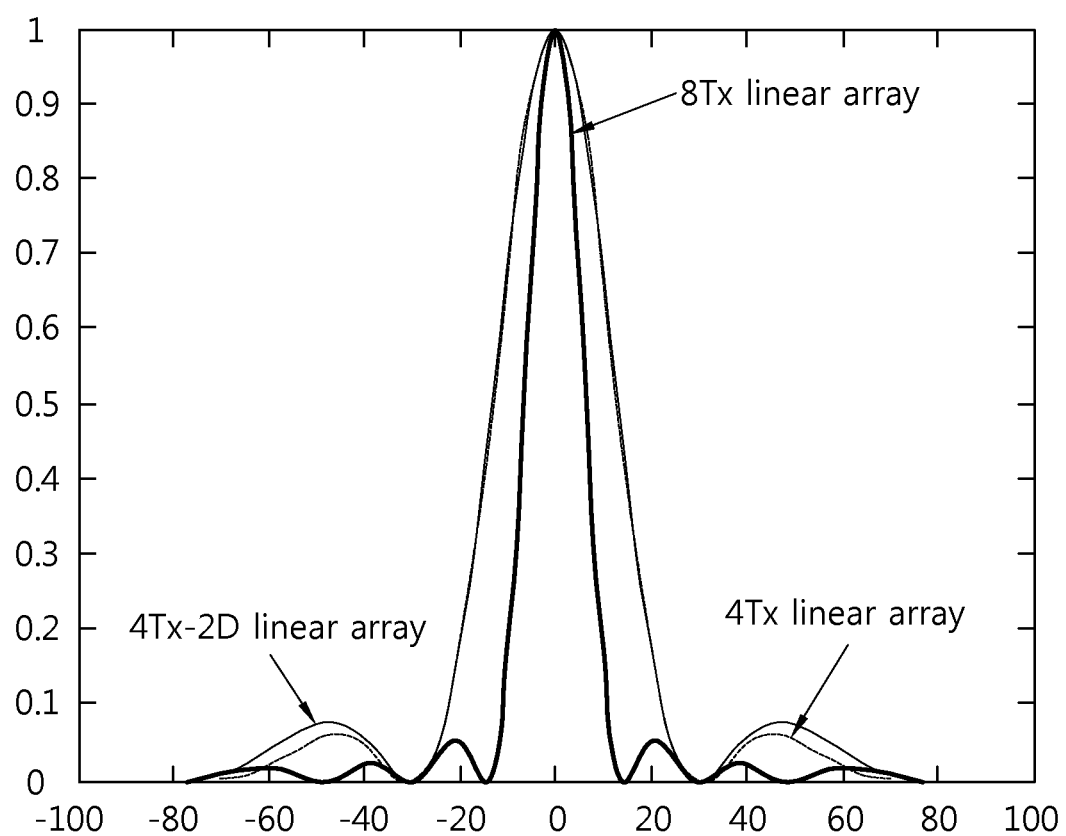
FIG. 15 is an example of a simulation result of the comparison of beamformings according to various kinds of transmission antenna arrays.

FIG. 15 is an example of a simulation result of the comparison of beamformings according to various kinds of transmission antenna arrays. This example corresponds to a case in which only the horizontal component of an angle of departure is taken into consideration and a case where θ=0°. An x axis is a beam width and a y axis shows a relative gain assuming that a maximum size of a signal is fixed to 1.

Referring to FIG. 15, if 8 linearly-arrayed transmission antennas are used, resolution is high because the beam width is the narrowest. In contrast, four linearly-arrayed transmission antennas have almost the same beam width as 2-D arrayed transmission antennas.

Figure 16:
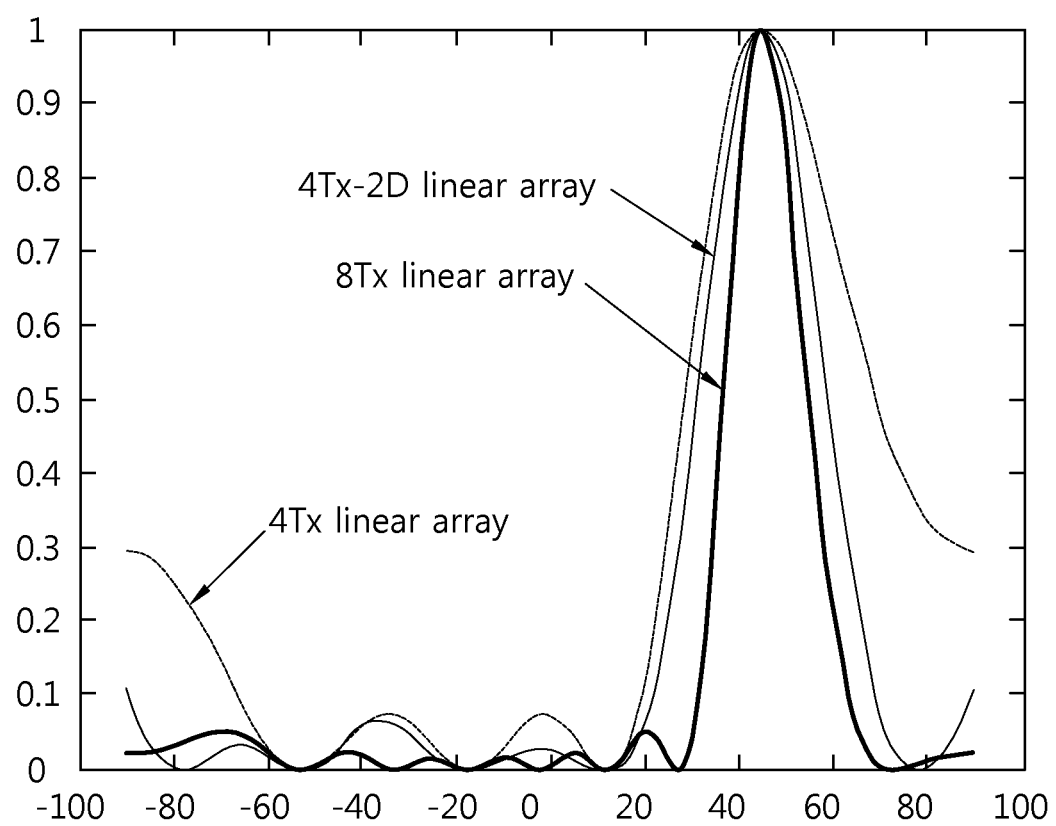
FIG. 16 is another example of a simulation result of the comparison of beamformings according to various kinds of transmission antenna arrays.

FIG. 16 is another example of a simulation result of the comparison of beamformings according to various kinds of transmission antenna arrays. This example corresponds to a case in which only the horizontal component of an angle of departure is taken into consideration and a case where θ=45°. An x axis is a beam width and a y axis shows a relative gain assuming that a maximum size of a signal is fixed to 1.

Referring to FIG. 16, if 8 linearly-arrayed transmission antennas are used, resolution is high because the beam width is still the narrowest. The beam width of 2-D arrayed transmission antennas is larger than that of a case in which 8 linearly-arrayed transmission antennas are used and is smaller that of a case in which 4 linearly-arrayed transmission antennas are used. Furthermore, the 4 linearly-arrayed transmission antennas show a tendency for a beam to be spread in the direction of an increasing AoD, whereas the 2-D arrayed transmission antennas maintain a stable beam shape.

Figure 17:
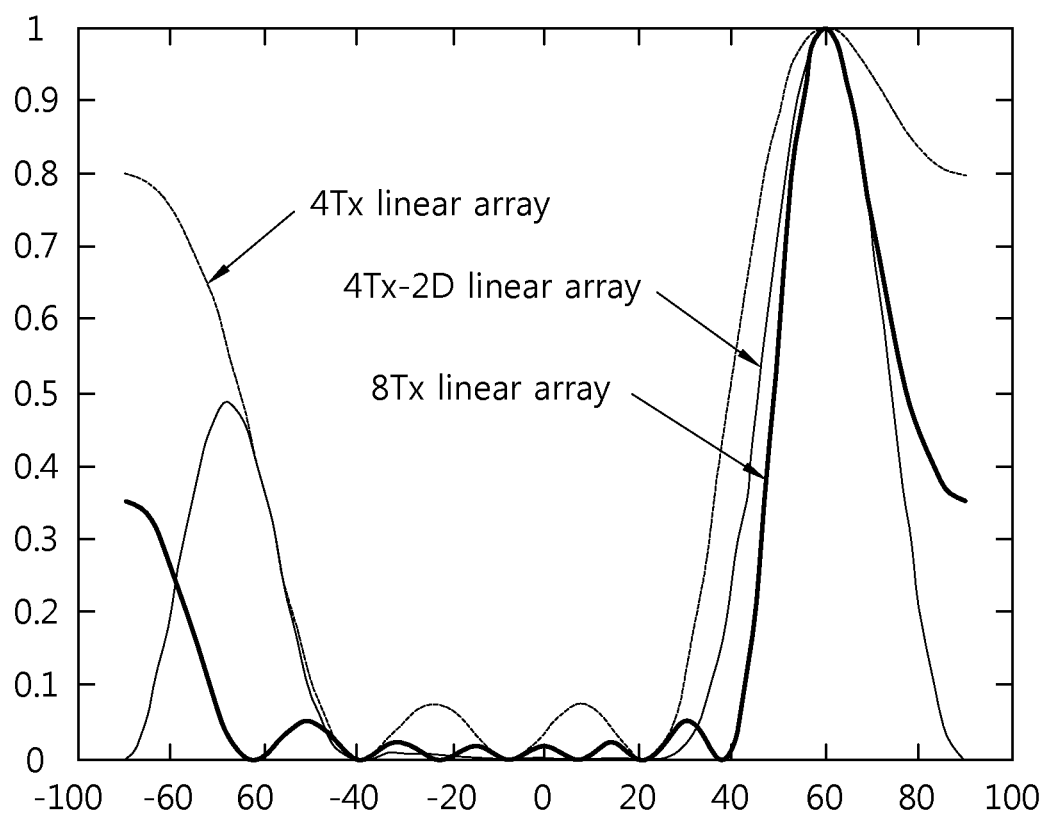
FIG. 17 is yet another example of a simulation result of the comparison of beamformings according to various kinds of transmission antenna arrays.

FIG. 17 is yet another example of a simulation result of the comparison of beamformings according to various kinds of transmission antenna arrays. This example corresponds to a case in which only the horizontal component of an angle of departure is taken into consideration and a case where θ=60°. An x axis is a beam width and a y axis shows a relative gain assuming that a maximum size of a signal is fixed to 1.

Referring to FIG. 17, if 4 linearly-arrayed transmission antennas are used, a beam width is very large. Meanwhile, 2-D arrayed transmission antennas have almost the same beam width as that of a case in which 8 linearly-arrayed transmission antennas are used.

An analysis into the simulation results of FIGS. 15 to 17 shows that the beam width of the 2-D arrayed transmission antennas is generally almost constant in a range of −20°~+20° depending on a change of the angle of departure. This is because a phase component included in each of the elements of a precoding matrix includes a cos component and a sin component as described above. The cos component and the sin component become alternately dominant according to a change of the angle of departure, thereby maintaining the beam width.

All the aforementioned functions can be executed by a processor, such as a microprocessor, a controller, a microcontroller, or Application Specific Integrated Circuits (ASICs) according to software or a program code coded to perform the functions. The design, development, and implementation of the code will be evident to a person having ordinary skill in the art on the basis of the description of the present invention.

Although the embodiments of the present invention have been described above, a person having ordinary skill in the art will appreciate that the present invention may be modified and changed in various ways without departing from the technical spirit and scope of the present invention. Accordingly, the present invention is not limited to the embodiments and it may be said that the present invention includes all embodiments within the scope of the claims below.

The invention claimed is:

1. A transmission apparatus, comprising:
a modulation unit generating modulation symbols by performing constellation mapping on input bits;
a precoding unit generating precoded symbols by multiplying the modulation symbols by a precoding matrix;
a plurality of transmission antennas sending the precoded symbols, the plurality of transmission antennas divided into two antenna groups; and
a precoding matrix configuration unit controlling elements of the precoding matrix so that a specific user equipment receives, from the two antenna groups, signals having an identical phase on an identical plane,
wherein the transmission antennas of a first antenna group are arrayed at a first distance on a straight line, and the transmission antennas of a second antenna group are arrayed at the first distance on a line parallel to the transmission antennas of the first antenna group, and
wherein the first antenna group and the second antenna group are spaced apart from each other at a second distance.

2. The transmission apparatus of claim 1, wherein the elements are mapped to the plurality of transmission antennas and comprise a phase component which determines phases of the modulation symbols.

3. The transmission apparatus of claim 2, wherein the phase component is a function of an Angle of Departure (angle of departure) that is an angle formed by a path of the signals, transmitted from the plurality of transmission antennas to the specific user equipment, and the plurality of transmission antennas.

4. The transmission apparatus of claim 2, wherein the phase component is a function using a value of the second distance as a parameter.

5. The transmission apparatus of claim 3, wherein the precoding matrix configuration unit configures the precoding matrix like Equation below:

$$\begin{vmatrix} 1 \\ e^{-jd_1 \sin\theta} \\ e^{-j2d_1 \sin\theta} \\ e^{-j3d_1 \sin\theta} \\ e^{d_2 \cos\theta} \\ e^{d_2 \cos\theta - jd_1 \sin\theta} \\ e^{d_2 \cos\theta - j2d_1 \sin\theta} \\ e^{d_2 \cos\theta - j3d_1 \sin\theta} \end{vmatrix}$$

wherein each of the first and the second antenna group comprises four transmission antennas, $d_1$ is the first distance, $d_2$ is the second distance, θ is the angle of departure, a first row to a fourth row of the precoding matrix are mapped to the first antenna group, and a fifth row to a eighth row of the precoding matrix are mapped to the second antenna group.

6. User equipment in a multiple antenna system, comprising:
reception antennas receiving precoded symbols from a base station based on a precoding matrix;
a de-precoding unit generating modulation symbols by multiplying the precoded symbols by an inverse precoding matrix; and
a demodulator demodulating the modulation symbols,
wherein the precoding matrix comprises a plurality of elements, and values of the plurality of elements are determined so that the user equipment receives, from two groups of transmission antennas, signals having an identical phase on an identical plane,
wherein a first group of transmission antennas are arrayed at a first distance on a straight line, and a second group of transmission antennas are arrayed at the first distance on a line parallel to the transmission antennas of the first antenna group, and
wherein the first group of transmission antennas and the second group of transmission antennas are spaced apart from each other at a second distance.

7. A transmission method, comprising the steps of:
generating modulation symbols by performing constellation mapping on input bits;
generating precoded symbols by multiplying the modulation symbols by a precoding matrix;
and sending the precoded symbols to user equipment using a plurality of transmission antennas,
wherein the plurality of transmission antennas is divided into two antenna groups, the transmission antennas of a first antenna group are arrayed at a first distance on a straight line, and the transmission antennas of a second antenna group are arrayed at the first distance on a line parallel to the transmission antennas of the first antenna group, wherein the precoding matrix comprises elements having a number identical with a number of the plurality of transmission antennas, wherein the elements are mapped to the plurality of transmission antennas in a one-to-one manner, wherein each of the elements comprises a phase component determining phases of the modulation symbols, and wherein the phase component determines the phase of the modulation symbol so that the user equipment receives signals, having an identical phase on an identical plane, from the two antenna groups.

8. A method of receiving signals in a multiple antenna system, comprising the steps of:

receiving precoded symbols from a base station based on a precoding matrix;

generating modulation symbols by multiplying the precoded symbols by an inverse precoding matrix; and demodulating the modulation symbols, wherein the precoding matrix comprises a plurality of elements, and values of the plurality of elements are determined so that user equipment receives signals, from two groups of transmission antennas, having an identical phase on an identical plane, wherein a first group of transmission antennas are arrayed at a first distance on a straight line, and a second group of transmission antennas are arrayed at the first distance on a line parallel to the transmission antennas of the first antenna group, and wherein the first group of transmission antennas and the second group of transmission antennas are spaced apart from each other at a second distance.

* * * * *